United States Patent [19]

Kawasaki et al.

[11] Patent Number: 5,430,117
[45] Date of Patent: Jul. 4, 1995

[54] NONCONJUGATED DIENE-VINYL AROMATIC-α-OLEFIN INTERPOLYMERS

[75] Inventors: Masaaki Kawasaki, Kuga; Keiji Okada, Ichihara; Kenzaburo Fukutani, Kuga; Tetsuo Tojo; Akemi Uchimi, both of Ichihara, all of Japan

[73] Assignee: Mitsui Petrochemical Industries, Ltd., Tokyo, Japan

[21] Appl. No.: 274,284

[22] Filed: Jul. 13, 1994

[30] Foreign Application Priority Data

| | | | |
|---|---|---|---|
| Jul. 14, 1993 | [JP] | Japan | 5-174501 |
| Sep. 3, 1993 | [JP] | Japan | 5-220289 |
| Sep. 3, 1993 | [JP] | Japan | 5-220291 |
| Sep. 3, 1993 | [JP] | Japan | 5-220292 |

[51] Int. Cl.⁶ .................. C08F 236/20; C08F 212/34
[52] U.S. Cl. .................. 526/336; 524/474; 526/337; 526/339; 526/340
[58] Field of Search ............ 526/336, 337, 339, 340

[56] References Cited

U.S. PATENT DOCUMENTS

| | | | |
|---|---|---|---|
| 2,609,359 | 9/1952 | Sparks et al. | |
| 3,933,769 | 1/1976 | Lal et al. | 526/336 |
| 4,011,178 | 3/1977 | Muse . | |
| 4,064,335 | 12/1977 | Lal et al. | 526/128 |
| 4,340,705 | 7/1982 | Lal et al. | 526/139 |
| 4,645,793 | 2/1987 | Von Hellens et al. | 524/518 |
| 5,223,576 | 6/1993 | Nakano | 525/133 |
| 5,262,503 | 11/1993 | Gotoh | 526/336 |
| 5,321,080 | 6/1994 | Kumano | 525/79 |

FOREIGN PATENT DOCUMENTS

| | | |
|---|---|---|
| 1011940 | 9/1979 | Canada . |
| 232463 | 8/1987 | European Pat. Off. . |
| 317240 | 5/1989 | European Pat. Off. . |
| 417313 | 3/1991 | European Pat. Off. . |
| 423363 | 4/1991 | European Pat. Off. . |
| 2295986 | 7/1976 | France . |
| 2301564 | 9/1976 | France . |
| 2361054 | 10/1975 | Germany . |

Primary Examiner—Fred Zitomer
Attorney, Agent, or Firm—Sherman and Shalloway

[57] ABSTRACT

There have been provided by the present invention a higher α-olefin copolymer which has an intrinsic viscosity [η], as measured in decalin at 135° C., of 0.1 to 10 dl/g, and comprises polymer units derived from 95–30 parts by mol of a higher α-olefin of $C_{6-20}$, 5–70 parts by mol of an aromatic ring-containing vinyl monomer represented by the formula [I] (total of the higher α-olefin and the vinyl monomer are 100 parts by mol), and 0.01 to 30% by mol of a non-conjugated diene represented by the formula [II];

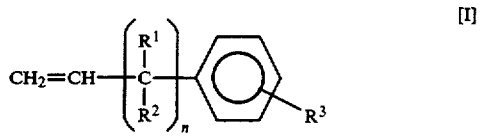

wherein n is an integer of 0 to 5, and $R^1$, $R^2$ and $R^3$ are each independently H or $C_{1-8}$ alkyl;

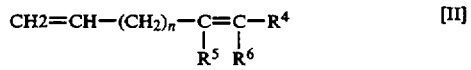

wherein n is an integer of 1 to 5, $R^4$ is $C_{1-4}$ alkyl, $R^5$ and are each independently H or $C_{1-8}$ alkyl but are not H simultaneously, a process for the preparation thereof, a higher α-olefin copolymer composition comprising [A] the higher α-olefin copolymer and [B] a diene rubber, and a rubber molded product comprising a vulcanized product of the higher α-olefin copolymer.

18 Claims, 1 Drawing Sheet

Fig. 1

Copolymer of higher α-olefin having 6-20 carbon atoms, aromatic ring-containing vinyl monomer and non-conjugated diene (A) Transition metal catalyst component
- Magnesium compound
- Titanium compound
- Electron donor (B) Organometallic catalyst component
- Organoaluminum compound (C) Third component
- Organosilicon compound

NONCONJUGATED DIENE-VINYL AROMATIC-α-OLEFIN INTERPOLYMERS

FIELD OF THE INVENTION

The present invention relates to a novel higher α-olefin copolymer, a process for the preparation of the copolymer, a rubber composition comprising the copolymer and a rubber molded product comprising a vulcanized product of the copolymer. More particularly, the invention relates to a higher α-olefin copolymer, a rubber composition and a rubber molded product which are excellent in not only dynamic fatigue resistance (flexural fatigue resistance), weathering resistance, ozone resistance, thermal aging resistance and low-temperature characteristics but also processability, compatibility with aromatic ring-containing polymers such as styrene/butadiene rubber (SBR) and covulcanizability therewith and which can be used for various rubber products, resin modifiers, etc. The invention also relates to a process for the preparation of such an excellent copolymer as mentioned above.

BACKGROUND OF THE INVENTION

Diene rubbers such as natural rubbers, isoprene rubber, SBR and BR have been widely used for tires, automotive parts, industrial parts, etc. because of their excellent processability and strength. Further, natural rubbers are excellent in dynamic fatigue resistance.

However, the diene rubbers have a problem of short life on account that they are low in weathering resistance and ozone resistance, and especially natural rubbers are low in heat resistance and ozone resistance.

As rubber materials for automotive tire tread, diene rubbers such as blends of styrene/butadiene copolymer rubbers and a polybutadiene rubber have been generally used. However, the tire tread formed from only the styrene/butadiene copolymer rubber has high rolling resistance and low abrasion resistance because of its low repulsion elasticity at 50° to 70° C., though it is relatively good in damping properties on the wet road surface (wet skid). For coping with this problem, there has been used a blend obtained by blending 100 parts by weight of the styrene/butadiene copolymer rubber with 10 to 50 parts by weight of the polybutadiene rubber.

With the request of saving energy in recent years, drastic reduction of the fuel cost and high abrasion resistance have been demanded, and in addition, damping properties on the wet road surface has been also demanded from the viewpoint of safety. However, the blend of the conventional styrene/butadiene copolymer rubber and the polybutadiene rubber is insufficient in the damping properties.

For improving those properties, a blend of a halogenated butyl rubber and a polybutadiene rubber has been proposed, but this blend is still insufficient in the damping properties, the abrasion resistance and the rolling resistance.

Hence, the advent of a rubber composition for tire tread which is particularly excellent in the abrasion resistance and the damping properties on the wet road surface and can be prominently reduced in the rolling resistance is also desired.

In constrast with the above diene rubbers, ethylene/propylene/diene (EPDM) copolymers have been widely used for rubber products such as automotive industrial parts, industrial rubber products, electrical insulating materials, civil engineering and building materials and rubberized fabrics; and plastic blend materials for polypropylene and polystyrene because of their high heat resistance and ozone resistance.

However, the EPDM copolymers are not applied to some special uses, for example, rubber vibration insulator, rubber roll, belt, tire, cover materials for vibrating portions, etc. because of their poor dynamic fatigue resistance.

With respect to copolymers of higher α-olefins and non-conjugated dienes, U.S. Pat. Nos. 3,933,769, 4,064,335 and 4,340,705 disclose a copolymer of a higher α-olefin, methyl-1,4-hexadiene and an α,ω-diene. The methyl-1,4-hexadiene is a mixture of 4-methyl-1,4-hexadiene and 5-methyl-1,4-hexadiene, and these monomers differ in the reaction rate from each other. Accordingly, when continuous polymerization is conducted, it is difficult to recover those monomers for the repeated use. Further, 4-methyl-1,4-hexadiene is different from 5-methyl-1,4-hexadiene in the copolymerization reactivity with the higher α-olefin, and hence there is involved such a problem that the monomer conversion is low and the polymerization efficiency is bad. Moreover, use of the α,ω-diene sometimes causes occurrence of gel in the resulting copolymer thereby to give an adverse effect to physical properties of the final product.

In the processes for preparing higher α-olefin copolymers described in the above specifications, titanium trichloride catalysts or catalysts formed from titanium tetrachloride and organoaluminum are used, and therefore the catalytic activity is not sufficiently high, resulting in a disadvantage of high production cost.

Accordingly, eagerly desired is the advent of a copolymer which is available at a low cost and is excellent in not only dynamic fatigue resistance (flexural fatigue resistance), weathering resistance, ozone resistance, thermal aging resistance and low-temperature characteristics but also processability, compatibility with aromatic ring-containing polymers such as SBR and covulcanizability therewith.

U.S. Pat. No. 4,645,793 discloses a blend of a diene rubber and an ethylene/α-olefin copolymer, which is improved in the weathering resistance and the ozone resistance Though this blend of the diene rubber and the ethylene/α-olefin copolymer is improved in the weathering resistance and the ozone resistance, it tends to be reduced in dynamic fatigue resistance (flexural fatigue resistance) or lowered in adhesion to fibers.

Accordingly, a vulcanizable rubber composition excellent in not only processability, strength, weathering resistance, ozone resistance and dynamic fatigue resistance but also adhesion to fibers has been conventionally desired.

Accordingly, there is desired the advent of long-life rubber molded products which are excellent in both of environmental aging resistance such as thermal aging resistance, weathering resistance, ozone resistance, etc., abrasion resistance, damping properties on the wet road surface, processability, compatibility with aromatic ring-containing polymers such as SBR, covulcanizability therewith, adhesion to fibers and dynamic fatigue resistance (flexural fatigue resistance).

The present inventors have earnestly studied on such copolymer, vulcanizable rubber composition, particularly rubber composition for tire tread, and molded products as mentioned above. As a result, they have found the followings and accomplished the present invention.

(1) When a specific higher α-olefin, a specific non-conjugated diene and a specific aromatic ring-containing vinyl monomer are copolymerized with each other in the presence of a specific catalyst for an olefin polymerization, there can be obtained a higher α-olefin copolymer which is excellent in not only dynamic fatigue resistance (flexural fatigue resistance), weathering resistance, ozone resistance, thermal aging resistance and low-temperature characteristics but also in processability, compatibility with aromatic ring-containing polymers such as SBR and covulcanizability therewith.

(2) When a copolymer obtained by copolymerizing a specific higher α-olefin, a specific non-conjugated diene and a specific aromatic ring-containing vinyl monomer in the presence of a specific catalyst for an olefin polymerization is blended with a diene rubber, there can be obtained a higher α-olefin copolymer rubber composition which is excellent in not only processability, strength, weathering resistance, ozone resistance and dynamic fatigue resistance but also adhesion to fibers.

(3) When a higher α-olefin copolymer obtained by copolymerizing a specific higher α-olefin, a specific aromatic ring-containing vinyl monomer and a specific non-conjugated diene in the presence of a specific catalyst for an olefin polymerization is blended with a diene rubber, there can be obtained a rubber composition for tire tread which is particularly excellent in both of abrasion resistance and damping properties on the wet road surface and can be prominently reduced in the rolling resistance.

(4) When a higher α-olefin copolymer obtained by copolymerizing a specific higher α-olefin, a specific non-conjugated diene and a specific aromatic ring-containing vinyl monomer in the presence of a specific catalyst for an olefin polymerization is vulcanized, there can be obtained a higher α-olefin copolymer rubber molded product which has a long life and is excellent in not only environmental aging resistance but also dynamic fatigue resistance (flexural fatigue resistance).

OBJECT OF THE INVENTION

The present invention is intended to solve such problems associated with prior art technique as mentioned above, and it is an object of the invention to provide a higher α-olefin copolymer which is excellent in not only dynamic fatigue resistance (flexural fatigue resistance), weathering resistance, ozone resistance, thermal aging resistance and low-temperature characteristics but also processability, compatibility with aromatic ring-containing polymers such as a styrene/butadiene rubber (SBR) and covulcanizability therewith, and to provide a process for efficiently preparing such higher α-olefin copolymer in a high yield.

It is another object of the invention to provide a higher α-olefin copolymer rubber composition which is excellent in not only processability, strength, weathering resistance, ozone resistance and dynamic fatigue resistance but also adhesion to fibers.

It is a further object of the invention to provide a rubber composition for tire tread which is excellent in strength, abrasion resistance and damping properties on the wet road surface (wet skid) and has low rolling resistance.

It is a still further object of the invention to provide a rubber molded product which is excellent in not only environmental aging resistance (thermal aging resistance, weathering resistance, ozone resistance) but also dynamic fatigue resistance, particularly a rubber molded product which is most suitably used for rolls, belts, wiper blades and vibration insulators.

SUMMARY OF THE INVENTION

The higher α-olefin copolymer according to the invention is a copolymer of a higher α-olefin having 6 to 20 carbon atoms, an aromatic ring-containing vinyl monomer represented by the following formula [I] and a non-conjugated diene represented by the following formula [II], said copolymer having:

(i) a molar ratio of the higher α-olefin to the aromatic ring-containing vinyl monomer ranging from 95/5 to 30/70, (ii) a content of the non-conjugated diene ranging from 0.01 to 30% by mol, and (iii) an intrinsic viscosity [η], as measured in decalin at 135° C., of 0.1 to 10 dl/g;

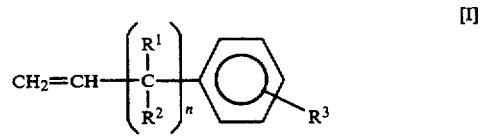

wherein n is an integer of 0 to 5, $R^1$, and $R^2$ and $R^3$ are each independently a hydrogen atom or an alkyl group of 1 to 8 carbon atoms;

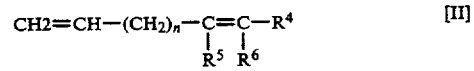

wherein n is an integer of 1 to 5, $R^4$ is an alkyl group of 1 to 4 carbon atoms, and $R^5$ and $R^6$ are each independently a hydrogen atom or an alkyl group of 1 to 8 carbon atoms, provided that both of $R^5$ and $R^6$ are not hydrogen atoms.

The process for the preparation of a higher α-olefin copolymer according to the invention is a process comprising a step of copolymerizing a higher α-olefin having 6 to 20 carbon atoms, an aromatic ring-containing vinyl monomer represented by the above formula [I] and a non-conjugated diene represented by the above formula [II] in the presence of an olefin polymerization catalyst formed from:

(a) a solid titanium catalyst component containing magnesium, titanium, halogen and an electron donor as its essential components, (b) an organoaluminum compound catalyst component, and (c) an electron donor catalyst component;

The higher α-olefin copolymer rubber composition according to the invention comprises:

[A] a higher α-olefin copolymer of a higher α-olefin having 6 to 20 carbon atoms, an aromatic ring-containing vinyl monomer represented by the above formula [I] and a non-conjugated diene represented by the above formula [II], and

[B] a diene rubber, a weight ratio ([A]/[B]) of said higher α-olefin copolymer [A] to said diene rubber [B] being in the range of 1/99 to 90/10.

The rubber composition for tire tread according to the invention comprises:

[A] a higher α-olefin copolymer of a higher α-olefin having 6 to 20 carbon atoms, an aromatic ring-containing vinyl monomer represented by the above formula [I] and a non-conjugated diene represented by the above formula [II], and

[B] a diene rubber, a weight ratio ([A]/[B]) of said higher α-olefin copolymer [A] to said diene rubber [B] being in the range of 1/99 to 50/50.

The higher α-olefin copolymer rubber molded product according to the invention is a higher α-olefin copolymer rubber molded product comprising a vulcanized product of a higher α-olefin copolymer, said copolymer being a copolymer of a higher α-olefin having 6 to 20 carbon atoms, an aromatic ring-containing vinyl monomer represented by the above formula [I] and a non-conjugated diene represented by the above formula [II], and having:

(i) a molar ratio of the higher α-olefin to the aromatic ring-containing vinyl monomer [higher α-olefin/aromatic ring-containing vinyl monomer] ranging from 95/5 to 30/70, (ii) a content of the non-conjugated diene ranging from 0.1 to 20% by mol, and (iii) an intrinsic viscosity [η], as measured in decalin at 135° C. of 0.1 to 10 dl/g

BRIEF DESCRIPTION OF THE DRAWING

FIG. 1 is a flow chart illustrating steps of a process for preparing a catalyst for an olefin polymerization which is used for preparing a higher α-olefin copolymer of the present invention.

DETAILED DESCRIPTION OF THE INVENTION

The higher α-olefin copolymer of the invention, the process for preparing said copolymer, the higher α-olefin copolymer composition comprising said copolymer and the rubber molded product comprising a vulcanized product of said copolymer are described in detail hereinafter.

First, the higher α-olefin copolymer of the invention is described below.

The higher α-olefin copolymer of the invention is a specific copolymer comprising a specific linear higher α-olefin, a specific aromatic ring-containing vinyl monomer and a specific non-conjugated diene in a specific ratio therebetween.

Higher α-olefin

The higher α-olefin for use in the invention is a higher α-olefin of 6 to 20 carbon atoms. Examples thereof include 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene.

In the invention, the above-exemplified higher α-olefins may be used singly or in combination of two or more kinds. Of the above higher α-olefins, particularly preferred are 1-hexene, 1-octene and 1-decene.

Aromatic ring-containing vinyl monomer

The aromatic ring-containing vinyl monomer for use in the invention is represented by the following formula [I].

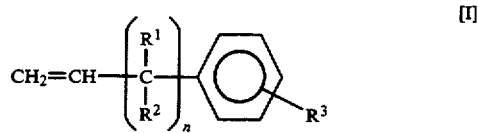

In the above formula [I], n is an integer of 0 to 5, and $R^1$, $R^2$ and $R^3$ are each independently a hydrogen atom or an alkyl group of 1 to 8 carbon atoms.

Examples of the aromatic ring-containing vinyl monomers include styrene, allylbenzene, 4-phenyl-1-butene, 3-phenyl-1-butene, 4-(4-methylphenyl)-1-butene, 4-(3-methylphenyl)-1-butene, 4-(2-methylphenyl)-1-butene, 4-(4-ethylphenyl)-1-butene, 4-(4-butylphenyl)-1-butene, 5-phenyl-1-pentene, 4-phenyl-1-pentene, 3-phenyl-1-pentene, 5-(4-methylphenyl)-1-pentene, 4-(2-methylphenyl)-1-pentene, 3-(4-methylphenyl)-1-pentene, 6-phenyl-1-hexene, 5-phenyl-1-hexene, 4-phenyl-1-hexene, 3-phenyl-1-hexene, 6-(4-methylphenyl)-1-hexene, 5-(2-methylphenyl)-1-hexene, 4-(4-methylphenyl)-1-hexene, 3-(2-methylphenyl)-1-hexene, 7-phenyl-1-heptene, 6-phenyl-1-heptene, 5-phenyl-1-heptene, 4-phenyl-1-heptene, 8-phenyl-1-octene, 7-phenyl-1-octene, 6-phenyl-1-octene, 5-phenyl-1-octene, 4-phenyl-1-octene, 3-phenyl-1-octene and 10-phenyl-1-decene.

In the present invention, the above-exemplified aromatic ring-containing vinyl monomers may be used singly or in combination of two or more kinds. Of the above aromatic ring-containing vinyl monomers, allylbenzene, 4-phenyl-1-butene are preferred, and 4-phenyl-1-butene is particularly preferred.

Non-conjugated diene

The non-conjugated diene for use in the present invention is represented by the following formula [II].

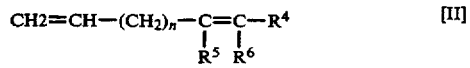

In the above formula [II], n is an integer of 1 to 5, $R^4$ is an alkyl group of 1 to 4 carbon atoms, and $R^5$ and $R^6$ are each independently a hydrogen atom or an alkyl group of 1 to 8 carbon atoms, provided that both of $R^5$ and $R^6$ are not hydrogen atoms. Examples of the non-conjugated diene include 4-methyl-1,4-hexadiene, 5-methyl-1,4-hexadiene, 4-ethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4- decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 7-methyl-1,6-decadiene, 6-ethyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene and 9-methyl-1,8-undecadiene.

In the present invention, the above-exemplified non-conjugated dienes may be used singly or in combination of two or more kinds.

In addition to the above non-conjugated dienes, other copolymerizable monomers such as ethylene, propylene, 1-butene and 4-methyl-1-pentene may be used with the proviso that the objects of the invention are not marred.

A molar ratio of constituent units derived from the higher α-olefin to constituent units derived from the aromatic ring-containing vinyl monomer (higher α-olefin/aromatic ring-containing vinyl monomer), both constituting the higher α-olefin copolymer of the invention, is within the range of 30/70 to 95/5, preferably 40/60 to 90/10, more preferably 50/50 to 80/20. These values of the molar ratio are those determined by means of a $^{13}$C-NMR method.

In the present invention, the higher α-olefin is copolymerized with the aromatic ring-containing vinyl monomer, and hence the resulting higher α-olefin copolymer can be improved in its processability, compatibility with aromatic ring-containing polymers such as SBR and covulcanizability therewith.

The content of the non-conjugated diene in the higher α-olefin copolymer of the present invention is in the range of 0.01 to 30% by mol, preferably 0.05 to 25% by mol, particularly 0.1 to 20% by mol. The iodine value of the higher α-olefin copolymer is in the range of 1 to 50, preferably 3 to 50, more preferably 5 to 40. This value is suitable for vulcanization of the higher α-olefin copolymer of the invention by the use of sulfur or peroxide.

The higher α-olefin copolymer of the invention has an intrinsic viscosity [η], as measured in a decalin solvent at 135° C., of 0.1 to 10.0 dl/g, preferably 1.0 to 7.0 dl/g. This value corresponds to a molecular weight of the higher α-olefin copolymer of the present invention.

The higher α-olefin copolymer of the present invention can be prepared by the following process.

The higher α-olefin copolymer of the present invention can be obtained by copolymerizing the higher α-olefin of 6 to 20 carbon atoms, the aromatic ring-containing vinyl monomer represented by the above formula [I] and the non-conjugated diene represented by the above formula [II] in the presence of a catalyst for an olefin polymerization.

The catalyst for an olefin polymerization used in the present invention is formed from a solid titanium catalyst component (a), an organoaluminum compound catalyst component (b) and an electron donor catalyst component (c).

FIG. 1 is a flow chart illustrating steps of a process for preparing the catalyst for an olefin polymerization which is used for the preparation of the higher α-olefin copolymer of the present invention.

The solid titanium catalyst component (a) used in the present invention is a highly active catalyst component containing, as its essential components, magnesium, titanium, halogen and an electron donor.

The solid titanium catalyst component (a) can be prepared by bringing a titanium compound, a magnesium compound and an electron donor which are described below into contact with each other.

The titanium compound used for preparing the solid titanium catalyst component (a) is, for example, a tetravalent titanium compound represented by the formula $Ti(OR)_gX_{4-g}$ (R is a hydrocarbon group, X is a halogen atom, and $0 \leq g \leq 4$).

Particular examples of the titanium compounds include:

titanium tetrahalides, such as $TiCl_4$, $TiBr_4$ and $TiI_4$;

alkoxytitanium trihalides, such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-iso-C_4H_9)Br_3$;

dialkoxytitanium dihalides such as, $Ti(OCH_3)_2Cl_2$, $Ti(OC_2H_5)_2Cl_2$, $Ti(O-n-C_4H_9)_2Cl_2$ and $Ti(OC_2H_5)_2Br_2$;

trialkoxytitanium monohalides, such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitaniums, such as $Ti(OCH_3)_4$, $Ti(OC_2H_5)_4$, $Ti(O-n-C_4H_9)_4$, $Ti(O-iso-C_4H_9)_4$ and $Ti(O-2-ethylhexyl)_4$.

Of these, preferred are halogen-containing titanium compounds, particularly, titanium tetrahalides, and most preferred is titanium tetrachloride. These titanium compounds may be used singly or in combination. Further, they can be used after diluting them in hydrocarbons or halogenated hydrocarbons.

In the present invention, any of trivalent titanium compounds and tetravalent titanium compounds may be used, but preferably used are tetravalent titanium compounds.

The magnesium compound used for preparing the solid titanium catalyst component (a) in the present invention includes a magnesium compound having reducing ability and a magnesium compound having no reducing ability.

The magnesium compound having reducing ability is, for example, a magnesium compound having a magnesium-hydrogen bond.

Examples of the magnesium compounds having reducing ability include dimethylmagnesium, diethylmagnesium, dipropylmagnesium, dibutylmagnesium, diamylmagnesium, dihexylmagnesium, didecylmagneisum, ethylmagnesium chloride, propylmagnesium chloride, butylmagnesium chloride, hexylmagnesium chloride, amylmagnesium chloride, butylethoxymagnesium, ethylbutylmagnesium, octylbutylmagnesium, butylmagnesium fluoride, butylmagnesium bromide and butylmagnesium iodine. These magnesium compounds may be used singly. Further, they may form complex compounds together with the organoaluminum compound described later. These magnesium compounds may be either liquid or solid.

Examples of the magnesium compounds having no reducing ability include:

magnesium halides, such as magnesium chloride, magnesium bromide, magnesium iodide and magnesium fluoride;

alkoxymagnesium halides, such as methoxymagnesium chloride, ethoxymagnesium chloride., isopropoxymagnesium chloride, butoxymagnesium chloride and octoxymagnesium chloride;

aryloxymagnesium halides, such as phenoxymagnesium chloride and methylphenoxymagnesium chloride;

alkoxymagnesiums, such as ethoxymagnesium, isopropoxymagnesium, butoxymagnesium, n-octoxymagnesium and 2-ethylhexoxymagnesium;

aryloxymagnesiums, such as phenoxymagnesium and dimethylphenoxymagnesium; and magnesium salts of carboxylic acid, such as magnesium laurate and magnesium stearate.

These magnesium compounds having no reducing ability may be compounds derived from the aforementioned magnesium compounds having reducing ability or compounds derived during the preparation of the catalyst components. In order to derive the magnesium compounds having no reducing ability, for example, the magnesium compounds having reducing ability are brought into contact with polysiloxane compounds, halogen-containing silane compounds, halogen-containing aluminum compounds, esters, alcohols, etc.

Other than the magnesium compounds having or not having reducing ability, also employable are complex compounds or double compounds of the above-mentioned magnesium compounds with other metals, and mixtures of the magnesium compounds with other metallic compounds. Further, mixtures of two or more kinds of the above compounds can be also employed.

Among the above-mentioned various magnesium compounds, preferred are magnesium compounds having no reducing ability, and of these, magnesium chloride, alkoxymagnesium chloride and aryloxymagnesium chloride are particularly preferred.

The electron donor used for preparing the solid titanium catalyst component (a) includes organic carboxylic esters (described later) and polycarboxylic esters.

Particular examples of the polycarboxylic esters include compounds having skeletons of the following formulas.

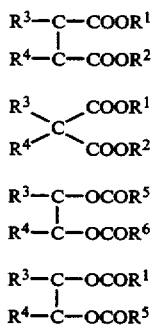

In the above formulas, $R^1$ is a substituted or unsubstituted hydrocarbon group; each of $R^2$ to $R^6$ is hydrogen or a substituted or unsubstituted hydrocarbon group, preferably at least one of $R^3$ and $R^4$ being a substituted or unsubstituted hydrocarbon group. $R^3$ and $R^4$ may be bonded to each other to form a cyclic structure. The substituted hydrocarbons include substituted hydrocarbons containing different atoms such as N, O and S, for example, those having at least one group selected from the groups consisting of —C—O—C—, —COO—, —COOH, —OH, —SO$_3$H, —C—N—C— and NH$_2$.

Of these, preferred are diesters derived from dicarboxylic acids having the above structures wherein at least one of $R^1$ and $R^2$ is an alkyl group of 2 or more carbon atoms.

Examples of the polycarboxylic esters include:

aliphatic polycarboxylates, such as diethyl succinate, dibutyl succinate, diethyl methylsuccinate, diisobutyl α-methylgultarate, dimethylmalonate, diethyl malonate, diethyl ethylmalonate, diethyl isopropylmalonate, diethyl butylmalonate, diethyl phenylmalonate, diethyl diethylmalonate, diethyl allylmalonate, diethyl diisobutylmalonate, diethyl dinormalbutylmalonate, dimethyl maleate, monooctyl maleate, diisooctyl maleate, diisobutyl maleate, diiusobutyl butylmaleate, diethyl butylmaleate, diisopropyl β-methylgultarate, diallyl ethylsuccinate, di-2-ethylhexyl fumarate, diethyl itaconate, diisobutyl itaconate, diisooctyl citraconate and dimethyl citraconate;

alicyclic polycarboxylates, such as diethyl 1,2-cyclohexanecarboxylate, diisobutyl 1,2-cyclohexanecarboxylate, diethyl tetrahydrophthalate and diethyl nadiate;

aromatic polycarboxylates, such as monoethyl phthalate, dimethyl phthalate, methylethyl phthalate, monoisobutyl phthalate, diethyl phthalate, ethylisobutyl phthalate, mono-n-butyl phthalate, ethyl-n-butyl phthalate, di-n-propyl phthalate, diisopropyl phthalate, di-n-butyl phthalate, diisobutyl phthalate, di-n-heptyl phthalate, di-2-ehtylhexyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and esters derived from heterocyclic polycarboxylic acids such as 3,4-frandicarboxylic acid.

Other examples of the polycarboxylic esters are esters derived from long chain dicarboxylic acids, such as diethyl adipate, diisobutyl adipate, diisopropyl sebacate, di-n-butyl sebacate, di-n-octyl sebacate and di-2-ethylhexyl sebacate.

Of these polycarboxylic esters, preferred are compounds having skeletons represented by the above formulae, and more preferred are esters derived from phthalic acid, maleic acid, substituted malonic acid or the like and alcohol of 2 or more carbon atoms. Particularly preferred are diesters obtained by reaction of phthalic acid and alcohol of 2 or more carbon atoms.

These polycarboxylic esters are not always required to be used as the starting material. Instead, compounds from which the polycarboxylic esters can be derived during the preparation of the solid titanium catalyst component (a) may be used, whereby the polycarboxylic ester is produced during the preparation of the solid titanium catalyst component (a).

Examples of the electron donors other than the polycarboxylic esters, which can be used for the preparation of the solid titanium catalyst component (a), include alcohols, amines, amides, ethers, ketones, nitriles, phosphines, stibines, arsines, phosphoramides, esters, thioethers, thioesters, acid anhydrides, acid halides, aldehydes, alcoholates, organosilane compounds such as alkoxy (aryloxy) silanes, organic acids, and amides and salts of metals in Group I to Group IV of the periodic table.

In the present invention, the solid titanium catalyst component (a) can be prepared by bringing the magnesium compound (or metallic magnesium), the electron donor and the titanium compound into contact with each other. For preparing the solid titanium catalyst component (a), there can be adopted a known process for preparing a highly active titanium catalyst component from a magnesium compound, a titanium compound and an electron donor. The above-mentioned each components may be contacted in the presence of other reaction agents such as silicon, phosphorus and aluminum.

Some examples of the processes for preparing the solid titanium catalyst component (a) are briefly described below.

(1) A process comprising a step of reacting the magnesium compound or a complex compound formed from the magnesium compound and the electron donor with the titanium compound in a liquid phase. This reaction may be carried out in the presence of a pulverization aid. Further, the solid compound may be pulverized prior to the reaction. Moreover, each components may be pretreated with a reaction aid such as an electron donor, an organoaluminum compound, a halogen-containing silicon compound and the like prior to the reaction. In this process, the electron donor is used at least once.

(2) A process comprising a step of reacting the liquid magnesium compound having no reducing ability with the liquid titanium compound in the presence of the electron donor to precipitate a solid titanium complex.

(3) A process comprising a step of further reacting the reaction product obtained by the process (2) with the titanium compound.

(4) A process comprising a step of further reacting the reaction product obtained by the process (1) or (2) with the electron donor and the titanium compound.

(5) A process comprising steps of pulverizing the magnesium compound or a complex compound formed from the magnesium compound and the electron donor in the presence of the titanium compound to give a solid and treating the solid with any one of halogen, a halogen compound and an aromatic hydrocarbon. In this process, the magnesium compound or the complex compound formed from the magnesium compound and the electron donor may be pulverized in the presence of a pulverization aid. After pulverization of the magnesium compound or the complex compound formed from the magnesium compound and the electron donor in the presence of the titanium compound, the magnesium compound or the complex compound may be pretreated with a reaction aid and then treated with halogen, etc. Examples of the reaction aids include organoaluminum compounds and halogen-containing silicon compounds. In this process, the electron donor is used at least once.

(6) A process comprising treating the compound obtained by any one of the processes (1) to (4) with halogen, a halogen compound or an aromatic hydrocarbon.

(7) A process comprising a step of bringing a reaction product of a metallic acid compound, dihydrocarbylmagnesium and halogen-containing alcohol into contact with the electron donor and the titanium compound.

(8) A process comprising a step of reacting the magnesium compound such as magnesium salt of organic acid, alkoxymagnesium or aryloxymagnesium with the electron donor, the titanium compound and/or a halogen-containing hydrocarbon.

Of the processes (1) to (8) for preparing the solid titanium catalyst component (a), preferred are the processes in which liquid titanium halide is used in the preparation of the catalyst and the process in which a halogenated hydrocarbon is used together with the titanium compound or after using the titanium compound.

The amounts of each components used for preparing the solid titanium catalyst component (a) vary depending on the process used, but for example, the electron donor is used in an amount of about 0.01 to 5 mol, preferably 0.05 to 2 mol, based on 1 mol of the magnesium compound, and the titanium compound is used in an amount of about 0.01 to 500 mol, preferably 0.05 to 300 mol, based on 1 mol of the magnesium compound.

The solid titanium catalyst component (a) thus obtained contains, as its essential components, magnesium titanium, halogen and an electron donor.

In the solid titanium catalyst component (a), an atomic ratio of halogen/titanium is about 4 to 200, preferably about 5 to 100, a molar ratio of electron donor/titanium is about 0.1 to 10, preferably about 0.2 to about 6, and an atomic ratio of magnesium/titanium is about 1 to 100, preferably about 2 to 50.

This solid titanium catalyst-component (a) contains halogenated magnesium having smaller crystal size as compared with commercially available halogenated magnesium, and the specific surface area thereof is usually not less than about 50 m$^2$/g, preferably about 60 to 1,000 m$^2$/g, more preferably about 100 to 800 m$^2$/g. This solid titanium catalyst component (a) is not varied in its composition even by washing with hexane, because the above components are united to form this catalyst component.

The solid titanium catalyst component (a) may be used singly. Further, it may be used after diluting it with an inorganic or organic compound such as a silicon compound, an aluminum compound and polyolefin. When the diluent is used, the solid titanium catalyst component (a) exhibits high catalytic activity even if the specific surface area is smaller than the above-mentioned one.

Processes for preparing the highly active solid titanium catalyst component (a) are described, for example, in Japanese Patent Laid-Open Publications No. 108385/1975, No. 126590/1975, No. 20297/1976, No. 28189/1976, No. 64586/1976, No. 92885/1976, No. 136625/1976, No. 87489/1977, No. 100596/1977, No. 147688/1977, No. 104593/1977, No. 2580/1978, No.40093/1978, No. 40094/1978, No. 43094/1978, No. 135102/1980, No. 135103/11980, No. 152710/1980, No. 811/1981, No. 11908/1981, No. 18606/1981, No. 83006/1983, No. 138705/1983, No. 138706/1983, No. 138707/1983, No. 138708/1983, No. 138709/1983, No. 138710/1983, No. 138715/1983, No. 23404/1985, No. 21109/1986, No. 37802/1986 and No. 37803/1986.

As the organoaluminum compound catalyst component (b), a compound containing at least one Al-carbon bond in the molecule can be used in the present invention.

Examples of such compound include:
(i) organoaluminum compounds represented by the formula $(R^1)_m Al(O(R^2))_n H_p X_q$
wherein $R^1$ and $R^2$ represent independently a hydrocarbon group having usually 1 to 15 carbon atoms, preferably 1 to 4 carbon atoms, H is a hydrogen atom, X is a halogen atom, and m, n, p and q are numbers satisfying the conditions of $0 < m \leq 3$, $0 \leq n < 3$, $0 \leq p < 3$, $0 \leq q < 3$, and $m+n+p+q=3$; and (ii) alkyl complex compounds of metals of Group I with aluminum represented by the formula $(M^1)Al(R^1)_4$
(wherein $M^1$ is Li, Na or K, and $R^1$ is the same as $R^1$ in the formula of the above compounds (i).

Examples of the organoaluminum compounds (i) include:

compounds of the formula $(R^1)_m Al(O(R^2))_{3-m}$ wherein $R^1$ and $R^2$ are the same as $R^1$ and $R^2$ in the formula of the compounds (i), m is a number satisfying the condition of $1.5 \leq m \leq 3$;

compounds of the formula $(R^1)_m AlX_{3-m}$ wherein $R^1$ is the same as $R^1$ in the formula of the compounds (i), X is halogen, and m is preferably a number satisfying the condition of $0 < m < 3$;

compounds of the formula $(R^1)_m AlH_{3-m}$ wherein $R^1$ is the same as $R^1$ in the formula of the compounds (i), and m is preferably a number satisfying the condition of $2 \leq m < 3$; and compounds of the formula $(R^1)$ real $(OR^2)_n X_q$ wherein $R^1$ and $R^2$ are the same as $R^1$ and $R^2$ in the formula of the compounds (i), X is halogen, and m, n and q are numbers satisfying the conditions of $0 < m \leq 3$, $0 \leq n < 3$, $0 \leq q < 3$, and $m+n+q=3$.

Particular examples of the aluminum compounds (i) include:

trialkylaluminums such as triethylaluminum and tributylaluminum;

trialkenylaluminums such as triisoprenylaluminum;

dialkylaluminum alkoxides such as diethylaluminum ethoxide and dibutylaluminum butoxide;

alkylaluminum sesquialkoxides such as ethylaluminum sesquiethoxide and butylaluminum sesquibotoxide;

partially alkoxylated alkylaluminums having an average composition represented by, for example, $(R_1)_{2.5} Al(O(R^2))_{0.5}$;

dialkylaluminum halides such as diethylaluminum chloride, dibutylaluminum chloride and diethylaluminum bromide;

alkylaluminum sesquihalides such as ethylaluminum sesquichloride, butylaluminum sesquichloride and ethylaluminum sesquibromide;

partially halogenated alkylaluminums such as alkylaluminum dihalides, e.g., ethylaluminum dichloride, propylaluminum dichloride and butylaluminum dibromide;

dialkylaluminum hydrides such as diethylaluminum hydride and dibutylaluminum hydride;

partially hydrogenated alkylaluminums such as alkylaluminum dihydrides, e.g., ethylaluminum dihydride and propylaluminum dihydride; and partially alkoxylated and halogenated alkylaluminums such as ethylaluminum ethoxychloride, butylaluminum butoxychloride and ethylaluminum ethoxybromide.

The analogues to the aluminum compounds (i) are, for example, organoaluminum compounds in which two or more aluminums are linked to each other by way of an oxygen atom or a nitrogen atom. Examples of such compounds include $(C_2H_5)_2AlOAl(C_2H_5)_2$, $(C_4H_9)_2AlOAl(C_4H_9)_2$, $(C_2H_5)AlN(C_2H_5)Al(C_2H_5)_2$ and methylaluminoxane.

Examples of the compounds. (ii) include $LiAl(C_2H_5)_4$ and $LiAl(C_7H_{15})_4$.

Of these, preferably used are trialkylaluminums and alkylaluminums in which the above-mentioned two or more aluminum compounds are bonded to each other.

Employable as the electron donor (c) are oxygen-containing electron donors such as alcohols, phenols, ketones, aldehydes, carboxylic acids, esters of organic or inorganic acids, ethers, acid amides, acid anhydrides and alkoxysilanes; nitrogen-containing electron donors such as ammonia, amines, nitriles and isocyanates; and the above-described polycarboxylic esters.

In more detail, these electron donors (c) include alcohols of 1 to 18 carbon atoms, such as methanol, ethanol, propanol, pentanol, hexanol, octanol, dodecanol, octadecyl alcohol, oleyl alcohol, benzyl alcohol, phenylethyl alcohol, cumyl alcohol, isopropyl alcohol and isopropylbenzyl alcohol;

phenols of 6 to 20 carbon atoms which may have a lower alkyl group, such as phenol, cresol, xylenol, ethyl phenol, propyl phenol, nonyl phenol, cumyl phenol and naphthol;

ketones of 3 to 15 carbon atoms, such as acetone, methyl ethyl ketone, methyl isobutyl ketone, acetophenone, benzophenone and benzoquinone;

aldehydes of 2 to 15 carbon atoms, such as acetaldehyde, propionaldehyde, octylaldehyde, benzaldehyde, tolualdehyde and naphthaldedehyde;

organic acid esters of 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, n-butyl maleate, diisobutyl methylmalonate, di-n-hexyl cyclohexenecarboxylate, diethyl nadiate, diisopropyl tetrahydrophthalate, diethyl phthalate, diisobutyl phthalate, di-n-butyl phthalate, di-2-ethylhexyl phthalate, γ-butyrolactone, δ-valerolactone, coumarin, phthalide and ethylene carbonate;

acid halides of 2 to 15 carbon atoms, such as acetyl chloride, benzoyl chloride, toluic acid chloride and anisic acid chloride;

ethers of 2 to 20 carbon atoms, such as methyl ether, ethyl ether, isopropyl ether, butyl ether, amyl ether, tetrahydrofuran, anisole and diphenyl ether;

acid amides, such as acetamide, benzamide and toluamide;

amines, such as methylamine, ethylamine, diethylamine, tributylamine, piperidine, tribenzylamine, aniline, pyridine, picoline and tetramethylenediamine;

nitriles such as acetonitrile, benzonitrile and trinitrile; and acid anhydrides such as acetic anhydride, phthalic anhydride and benzoic anhydride.

Also employable as the electron donor (c) is an organosilicon compound represented by the following formula [1]:

 [1]

wherein each of R and R' is a hydrocarbon group, and a is a number satisfying the condition of $0 < n < 4$.

Examples of the organosilicon compounds represented by the above formula [1] include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilne, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, methyltriallyoxysilane, vinyltris(β-methoxyethoxysilane), vinyltriacetoxysilane and dimethltetraethoxysilane.

Of these, preferred are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane and diphenyldiethoxysilane.

Also employable as the electron donor (c) is an organosilicon compound represented by the following formula [2]:

$$SiR^1R^2{}_m(OR^3)_{3-m} \qquad [2]$$

wherein $R^1$ is a cyclopentyl group or a cyclopentyl group having an alkyl group, $R^2$ is a group selected from the group consisting of an alkyl group, a cyclopentyl group and a cyclopentyl group having an alkyl group, $R^3$ is a hydrocarbon group, and m is a number satisfying the condition of $0 \leq m \leq 2$.

In the above formula [2], $R^1$ is a cyclopentyl group or a cyclopentyl group having an alkyl group. Examples of the cyclopentyl group having an alkyl group include 2-methylcylopentyl, 3-methylcyclopentyl, 2-ethylcyclopentyl and 2,3-dimethylcycloopentyl.

In the above formula [2], $R^2$ is an alkyl group, a cyclopentyl group or a cyclopentyl group having an alkyl group. Examples thereof include an alkyl group such as methyl, ethyl, propyl, isopropyl, butyl and hexyl; and the cyclopentyl group and the cyclopentyl group having an alkyl group as mentioned with respect to $R^1$.

In the above formula [2], $R^3$ is a hydrocarbon group, e.g., alkyl group, cycloalkyl group, aryl group and aralkyl group.

Of various organosilicon compounds of the formula [2], preferably used are those having the formula [2] wherein $R^1$ is a cyclopentyl group, $R^2$ is an alkyl group or a cyclopentyl group, and $R^3$ is an alkyl group, particularly, methyl or ethyl.

Examples of such organosilicon compounds include:
trialkoxysilanes, such as cyclopentyltrimethoxysilane, 2-methylcyclopentyltrimethoxysilane, 2,3-dimethylcyclopentyltrimethoxysilane and cyclopentyltriethoxysilane;
dialkoxysilanes, such as dicyclopentyldimethoxysilane, bis(2-methylcyclopentyl)dimethoxysilane, bis(2,3-dimethylcyclopentyl)dimethoxysilane and dicyclopentyldiethoxysilane; and
monoalkoxysilanes, such as tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane and cyclopentyldimethylethoxysilane.

Among the above electron donors, preferred are organic carboxylates and organosilicon compounds, and of these, particularly preferred are organosilicon compounds.

The catalyst for an olefin polymerization used in the present invention is formed from the solid titanium catalyst component (a), the organoaluminum compound catalyst component (b) and the electron donor catalyst component (c). In the present invention, the aforesaid higher α-olefin, aromatic ring-containing vinyl monomer and non-conjugated diene are copolymerized with each other using this catalyst for an olefin polymerization. It is also possible to prepolymerize an α-olefin or a higher α-olefin using this catalyst for an olefin polymerization and then polymerize the higher α-olefin with the aromatic ring-containing vinyl monomer and the non-conjugated diene using this catalyst. In the prepolymerization, an α-olefin or a higher α-olefin is prepolymerized in an amount of 0.1 to 500 g, preferably 0.3 to 300 g, particularly preferably 1 to 100 g, based on 1 g of the catalyst for an olefin polymerization.

The catalyst concentration in the reaction system for the prepolymerization may be much higher than that in the reaction system for the polymerization.

The amount of the solid titanium catalyst component (a) used for the prepolymerization is generally in the range of about 0.01 to 200 mmol, preferably about 0.1 to 100 mmol, more preferably 1 to 50 mmol, in terms of titanium atom, based on 1 liter of an inert hydrocarbon medium described later.

The organoaluminum compound catalyst component (b) is used in such an amount that a polymer is produced in an amount of 0.1 to 500 g, preferably 0.3 to 300 g, per 1 g of the solid titanium catalyst component (a). In concrete, the amount of the organoaluminum compound catalyst component (b) is generally in the range of about 0.1 to 100 mol, preferably about 0.5 to 50 mol, more preferably 1 to 20 mol, based on 1 mol of the titanium atom contained in the solid titanium catalyst component (a).

The electron donor catalyst component (c) is used in an amount of 0.1 to 50 mol, preferably 0.5 to 30 mol, more preferably 1 to 10 mol, based on 1 mol of the titanium atom contained in the solid titanium catalyst component (a). The prepolymerization is carried out preferably under mild conditions by adding either an olefin or a higher α-olefin and the above catalyst components to an inert hydrocarbon medium.

Examples of the inert hydrocarbon medium used herein include:
aliphatic hydrocarbons, such as propane, butane, pentane, hexane, heptane, octane, decane, dodecane and kerosine;
alicyclic hydrocarbons, such as cyclopentane, cyclohexane and methylcyclopentane;
aromatic hydrocarbons, such as benzene, toluene and xylene;
halogenated hydrocarbons, such as ethylene chloride and chlorobenzene; and
mixtures of these hydrocarbons.

Of these inert hydrocarbon media, aliphatic hydrocarbons are particularly preferably used. The olefin or the higher α-olefin itself may be prepolymerized in a solvent or may be prepolymerized in a state where a solvent does not substantially exist.

The higher α-olefin used in the prepolymerization may be the same or different from the higher α-olefin used in the polymerization described later.

The reaction temperature for the prepolymerization is in the range of usually about −20° to +100° C., preferably about −20° to +80° C., more preferably 0° to +40° C.

A molecular weight regulator such as hydrogen can be used in the prepolymerization. The molecular weight regulator is desirably used in such an amount that a polymer obtained by the prepolymerization has an intrinsic viscosity [η], as measured in a decalin solvent at 135° C., of not less than about 0.2 dl/g, preferably in the range of about 0.5 to 10 dl/g.

The prepolymerization is desirably carried out in such a manner that a polymer is produced in an amount of about 0.1 to 500 g, preferably about 0.3 to 300 g, more preferably 1 to 100 g, based on 1 g of the solid titanium catalyst component (a). If the amount of the polymer produced in the prepolymerization is too much, the production efficiency of the finally produced olefin polymer is sometimes reduced.

The prepolymerization can be carried out either batchwise or continuously.

In the presence of the catalyst for an olefin polymerization formed from the solid titanium catalyst component (a) (or the prepolymerized solid titanium catalyst component (a) obtained by the prepolymerization using the catalyst for an olefin polymerization), the organoaluminum compound catalyst component (b) and the electron donor catalyst component (c), copolymerization (polymerization) of the higher α-olefin, the aromatic ring-containing vinyl monomer and the non-conjugated diene is carried out.

In the copolymerization of the higher α-olefin, the aromatic ring-containing vinyl monomer and the non-conjugated diene, a component similar to the organoaluminum compound catalyst component (b) used for preparing the catalyst for an olefin polymerization may be used as the organoaluminum compound catalyst compnent, in addition to the above catalyst for an olefin polymerization. Further, in the copolymerization of the higher α-olefin, the aromatic ring-containing vinyl monomer and the non-conjugated diene, a component similar to the electron donor catalyst component (c) used for preparing the catalyst for an olefin polymerization may be used as the electron donor catalyst component. The organoaluminum compound and the electron donor used in the copolymerization of the higher α-olefin, the aromatic ring-containing vinyl monomer and the non-conjugated diene are not always the same as those used for preparing the above-mentioned catalyst for an olefin polymerization.

The copolymerization of the higher α-olefin, the aromatic ring-containing vinyl monomer and the non-conjugated diene is generally carried out in a liquid phase.

As the reaction medium for the polymerization, the aforementioned inert hydrocarbon medium can be used, or an olefin which is liquid at a reaction temperature can be used.

In the copolymerization of the higher α-olefin, the aromatic ring-containing vinyl monomer and the non-conjugated diene, the solid titanium catalyst, component (a) is used in an amount of usually about 0.001 to about 1.0 mmol, preferably about 0.005 to 0.5 mmol, in terms of titanium atom, based on 1 liter of the polymerization volume. The organoaluminum compound catalyst component (b) is used in such an amount that the metal atom contained in the organoaluminum compound catalyst component (b) is in the range of usually about 1 to 2,000 mol, preferably about 5 to 500 mol, based on 1 mol of the titanium atom contained in the solid titanium catalyst component (a). The electron donor catalyst component (c) is used in an amount of usually about 0.001 to 10 mol, preferably 0.01 to 2 mol, more preferably 0.05 to 1 mol, based on 1 mol of the metal atom contained in the organoaluminum compound catalyst component (b).

If hydrogen is used in the copolymerization, a molecular weight of the resulting polymer can be regulated.

The temperature for the polymerization of the higher α-olefin, the aromatic ring-containing vinyl monomer and the non-conjugated diene is in the range of usually about 20° to 200° C., preferably about 40° to 100° C., and the pressure therefor is in the range of usually atmospheric pressure to 100 kg/cm$^2$, preferably atmospheric pressure to 50 kg/cm$^2$. The copolymerization of the higher α-olefin, the aromatic ring-containing vinyl monomer and the non-conjugated conjugated diene may be carried out batchwise, semi-continuously or continuously. Further, the copolymerization may be carried out in two or more steps having reaction conditions different from each other.

The higher α-olefin copolymer of the present invention obtained by the above-mentioned polymerization is excellent in not only dynamic fatigue resistance (flexural fatigue resistance), weathering resistance, ozone resistance, thermal aging resistance and low-temperature characteristics but also processability, compatibility with aromatic ring-containing polymers such as SBR and covulcanizability therewith. Especially when this copolymer is applied to resin modifiers and various rubber products, its excellent properties are exhibited with maximum level.

The higher α-olefin copolymer of the present invention can be used as a resin modifier, for example, a modifier for polypropylene, polyethylene, polybutene, polystyrene and an ethylene/cycloolefin copolymer. When the higher α-olefin copolymer of the present invention is added to those resins, impact resistance and stress cracking resistance of the resins can be remarkably improved.

Various rubber products are generally used in the vulcanized form, and when the higher α-olefin copolymer of the present invention is used in the vulcanized form, its excellent characteristics are further exhibited. In the case where the higher α-olefin copolymer of the present invention is used for various rubber products, a vulcanized product of this copolymer can be prepared by first preparing an unvulcanized rubber compound, and then molding the rubber compound into a desired form, followed by vulcanization thereof, in the same manner as that for the conventional vulcanization of ordinary rubbers.

For vulcanizing the molded rubber compound, either a method of heating the rubber compound with a vulcanizing agent or a method of irradiating the rubber compound with electron rays may be utilized.

The vulcanizing agent used for the vulcanization is, for example, a sulfur, sulfur-containing compound or an organic peroxide.

Examples of the sulfur or the sulfur-containing compounds include sulfur, sulfur chloride, sulfur dichloride, morpholine disulfide, alkylphenol disulfide, tetramethylthiuram disulfide and selenium dimethyldithiocarbamate. Of these, sulfur is preferably used. The sulfur or the sulfur-containing compound is used in an amount of 0.1 to 10 parts by weight, preferably 0.5 to 5 parts by weight, based on 100 parts by weight of the higher α-olefin copolymer of the present invention.

As the organic peroxides, those used for conventional peroxide-vulcanization of ordinary rubbers can be used. Examples of the organic peroxides include dicumyl peroxide, di-t-butyl peroxide, di-t-butyl peroxy-3,3,5-trimethylcyclohexane, t-butyl hydroperoxide, t-butylcumyl peroxide, benzoyl peroxide, 2,5-dimethyl-2,5-di(t-butylperoxy)hexyn-3, 2,5-dimethyl-2,5-di(benzoylperoxy)hexane, 2,5-dimethyl-2,5-mono(t-butylperoxy)-hexane and α,α'-bis(t-butylperoxy-m-isopropyl)benzene. Of these, preferably used are dicumyl peroxide, di-t-butyl peroxide and di-t-butylperoxy-3,3, 5-trimethylcyclohexane. These organic peroxides are used singly or in combination of two or more kinds. The organic peroxide is used in an amount of 0.0003 to 0.05 mol, preferably 0.001 to 0.03 mol, based on 100 g of the higher α-olefin copolymer. It is desired that the optimum amount of the organic peroxide is determined according to the physical property values required.

When the sulfur or the sulfur-containing compound is used as the vulcanizing agent, it is preferred to use a vulcanization accelerator in combination.

Examples of the vulcanization accelerators include:
thiazole compounds, such as N-cyclohexyl-2-benzothiazolesulfenamide, N-oxydiethylene-2-benzothiazolesulfenamide, N,N-diisopropyl-2-benzothiazolesulfenamide, 2-mercaptobenzothiazole, 2-(2,4-dinitrophenyl)mercaptobenzothiazole, 2-(2,6-diethyl-4-morpholinothio)benzothiazole and dibenzothiazyl disulfide;

guanidine compounds, such as diphenylguanidine, triphenylguanidine, diorthonitrileguanidine, orthonitrilebiguanide and diphenylguanidine phthalate;

aldehyde/amine or ammonia reaction products, such as acetaldehyde/aniline reaction product, butylaldehyde/aniline condensation product, hexamethylenetetramine and acetaldehyde ammonia;

imidazoline compounds, such as 2-mercaptoimidazoline;

thiourea compounds, such as thiocarbanilide, diethylthiourea, dibutylthiourea, trimethylthiourea and diorthotolylthiourea;

thiuram compounds, such as tetramethylthiuram monosulfide, tetramethylthiuram disulfide, tetraethylthiuram disulfide, tetrabutylthiuram disulfide and pentamethylenethiuram tetrasulfide;

salts of dithio acids, such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate;

xanthate compounds, such as zinc dibutyl xanthate; and other compounds, such as zinc white.

The vulcanization accelerator is used in an amount of 0.1 to 20 parts by weight, preferably 0.2 to 10 parts by weight, based on 100 parts by weight of the higher α-olefin copolymer.

When the organic peroxide is used as the vulcanizing agent, it is preferred to use a vulcanization assisting agent in combination. Examples of the vulcanization assisting agents include sulfur; quinonedioxime compounds such as p-quinonedioxime; methacrylate compounds such as polyethylene glycol dimethacrylate; allyl compounds such as diallyl phthalate and triallyl cyanurate; maleimide compounds; and divinylbenzene. The vulcanization assisting agent is used in an amount of 0.5 to 2 mol, preferably about 1 mol, based on 1 mol of the organic peroxide used.

When the vulcanization is carried out not using the vulcanizing agent but using electron rays, the unvulcanized molded rubber compound described later is irradiated with electron rays having energy of 0.1 to 10 MeV (mega-electronvolt), preferably 0.3 to 2 MeV, so that the ray-absorption amount is 0.5 to 35 Mrad (megarad), preferably 0.5 to 10 Mrad.

When the vulcanization is carried out using the electron rays, the vulcanization assisting agent may be used in combination with organic peroxide which is the vulcanizing agent, and the amount of the organic peroxide used herein is in the range of 0.0001 to 0.1 mol, preferably 0.001 to 0.03 mol, based on 100 g of the higher α-olefin copolymer.

The unvulcanized rubber compound is prepared by the following process. That is, the higher α-olefin copolymer, a filler and a softening agent are kneaded in a mixing device such as a Banbury mixer at a temperature of 80 to 170° C. for 3 to 10 minutes, to the resulting kneadate is then added the vulcanizing agent and if necessary the vulcanization accelerator or the vulcanization assisting agent, and the resulting mixture is kneaded at a roll temperature of 40° to 80° C. for 5 to 30 minutes using a roll such as an open-roll. Thereafter, the resulting mixture is rolled to prepare a rubber compound in the form of a ribbon or a sheet. As described above, a rubber compound comprising the higher α-olefin copolymer of the present invention, i.e., a vulcanizable rubber composition, is prepared by mixing each components by means of mixing devices which are conventionally used in the ordinary rubber industry, such as a roll, a Banbury mixer and a kneader. Further, to the rubber compound may be appropriately added, if necessary, various additives which may be used in the ordinary rubber industry, such as reinforcing agents (e.g., carbon black and silica), fillers (e.g., calcium carbonate and talc), crosslinking assisting agents (e.g., triallyl isocyanurate, trimethylolpropane triacrylate and m-phenylenebismaleimide), plasticizers, stabilizers, processing aids and colorants.

The rubber compound prepared as explained above is then molded into a desired form by means of an extrusion molding machine, a calender roll or a press. Vulcanization of the rubber compound is carried out simultaneously with the molding process or thereafter. That is, the rubber compound or its molded product is introduced into a vulcanizing vessel and vulcanized therein by heating it at a temperature of 150° to 270° C. for 1 to 30 minutes or by irradiating it with electron rays in the manner mentioned before, to obtain a vulcanized product. The vulcanization process may be carried out using a mold or not using a mold. When a mold is not used, molding and vulcanization are generally conducted continuously. For heating the rubber compound or its molded product in the vulcanizing vessel, the vessel is heated using hot air, glass bead fluidized bed, UHF (ultrahigh frequency electromagnetic wave), steam, etc. As a matter of course, when the vulcanization is carried out by irradiation with electron rays, a rubber compound containing no vulcanizing agent is usually used.

The vulcanized rubber product prepared as above can be per se used as automotive industrial parts such as rubber vibration insulators, tires and cover materials for vibrating portions; industrial rubber products such as rubber rolls and belts; electrical insulators; civil engineering and building materials; rubberized fabrics; etc. If a foaming agent is added to the unvulcanized rubber to foam the rubber under heating, a foamed material can be obtained, and this foamed material can be used as a heat insulating material, a cushioning material, a sealing material, etc.

Next, the higher α-olefin copolymer rubber composition of the invention is described.

The higher α-olefin copolymer rubber composition of the invention comprises a higher α-olefin copolymer [A] and a diene rubber [B]. This higher α-olefin copolymer [A] is the aforesaid higher α-olefin copolymer.

The diene rubber [B] may be a conventionally known diene rubber, and examples thereof include natural rubbers, isoprene rubber, SBR, BR, CR and NBR.

As the natural rubbers, those standardized by Green Book (International Quality & Package Standard of Natural Rubber Ratings) are generally used.

The isoprene rubber used herein has a specific gravity of 0.91 to 0.94 and a Mooney viscosity $[ML_{1+4} (100°C.)]$ of 30 to 120, and the SBR used herein has a specific gravity of 0.91 to 0.98 and a Mooney viscosity $[ML_{1+4} (100°C.)]$ of 20 to 120.

The BR used herein has a specific gravity of 0.90 to 0.95 and a Mooney viscosity $[ML_{1+4} (100°C.)]$ of 20 to 120.

In the present invention, the above-mentioned diene rubbers may be used singly or as a mixture of two or more kinds.

Of the diene rubbers, preferably used are natural rubbers, isoprene rubber, SBR, BR and a mixture of these rubbers.

A weight ratio ([A]/[B]) of the higher α-olefin copolymer [A] to the diene rubber [B], which constitute the higher α-olefin copolymer rubber composition of the present invention, is in the range of 1/99 to 90/10, preferably 2/98 to 80/20, more preferably 3/97 to 70/30.

To the rubber composition of the present invention, there can be added reinforcing agents such as carbon black (e.g., SRF, GPF, FEF, HAF, ISAF, SAF, FT and MT) and finely-ground silicic acid; and fillers such as light calcium carbonate, heavy calcium carbonate, talc, clay and silica. The amount and kind of the rubber reinforcing agent or the filler used can be appropriately determined according to use of the resulting rubber composition, but the amount thereof is generally at most 300 parts by weight, preferably at most 200 parts by weight, based on 100 parts by weight of the total amount of the higher α-olefin copolymer [A] and the diene rubber [B].

The rubber composition of the present invention can be used in the unvulcanized form, but if it is used in the vulcanized form, the characteristics thereof are best exhibited. That is, the higher α-olefin copolymer [A] for forming the rubber composition of the present invention serves to enhance weathering resistance, ozone resistance, mutual solubility and co-vulcanizability with the diene rubber [B], etc. of the vulcanized product, the diene rubber [B] serves to enhance strength and adhesion to fibers, etc. of the vulcanized product, and therefore a vulcanized product excellent in not only strength, weathering resistance, ozone resistance and dynamic fatigue resistance but also adhesion to fibers can be obtained from the rubber composition of the present invention.

When a vulcanized product is obtained from the rubber composition of the present invention, the amounts and the kinds of the higher α-olefin copolymer [A], the diene rubber [B], the reinforcing agent, the filler and the softening agent can be appropriately determined in accordance with the desired use and performance of the resulting vulcanized product. Further, the amounts and the kinds of the compounds for constituting the vulcanization system such as a vulcanizing agent, a vulcanization accelerator and a vulcanization assisting agent, the amounts and the kinds of the anti-aging agent and the processing aid, and the process for preparing the vulcanized product can be also appropriately determined in accordance with the desired use and performance of the resulting vulcanized product.

The total amount of the higher α-olefin copolymer [A] and the diene rubber [B] in the vulcanized product can be suitably determined in accordance with the desired use and performance of the vulcanized product, but it is in the range of usually not less than 20% by weight, preferably not less than 25% by weight.

As the softening agents, those generally used for rubbers can be employed. Examples of the softening agents include petroleum softening agents such as process oil, lubricating oil, paraffin, liquid paraffin, petroleum asphalt and vaseline; coal tar softening agents, such as coal tar and coal tar pitch; fatty oil softening agents, such as castor oil, linseed oil, rapeseed oil and coconut oil; tall oil; factice; waxes such as beewax, carnauba wax and lanolin; fatty acids and salts thereof such as ricinolic acid, palmitic acid, barium stearate, calcium stearate and zinc laurate; and synthetic polymer materials such as petroleum resin, atactic polypropylene and coumarone-indene resin. Of these, preferred are petroleum softening agents, and particularly preferred is process oil. The amount of the softening agent used can be appropriately determined according to use of the resulting vulcanized product, but the amount thereof is generally at most 150 parts by weight, preferably at most 100 parts by weight, based on 100 parts by weight of the total amount of the higher α-olefin copolymer [A] and the diene rubber [B].

For preparing the vulcanized product from the rubber composition of the present invention, an unvulcanized rubber compound is first prepared, and the rubber compound is then molded into a desired shape, followed by vulcanization of the molded rubber compound.

For vulcanizing the molded rubber compound, either a method of heating the rubber compound with a vulcanizing agent or a method of irradiating the rubber compound with electron rays may be utilized.

Examples of the vulcanizing agent used for the vulcanization include the sulfur, the aforesaid sulfur-containing compounds and organic peroxides. Especially when the sulfur or the sulfur-containing compound is used, the performance of the rubber composition can be best exhibited.

The sulfur or the sulfur-containing compound is used in an amount of 0.1 to 10 parts by weight, preferably 0.5 to 5 parts by weight, based on 100 parts by weight of the total amount of the higher α-olefin copolymer [A] and the diene rubber [B].

When the sulfur or the sulfur-containing compound is used as the vulcanizing agent, it is preferred to use the aforesaid vulcanization accelerator in combination. The vulcanization accelerator is used in an amount of 0.1 to 20 parts by weight, preferably 0.2 to 10 parts by weight, based on 100 parts by weight of the total amount of the higher α-olefin copolymer [A] and the diene rubber [B].

The organic peroxide is used in an amount of 0.0003 to 0.05 mol, preferably 0.001 to 0.03 mol, based on 100 g of the total amount of the higher α-olefin copolymer [A] and the diene rubber [B]. The optimum amount of the organic peroxide is desirable to be determined in accordance with the required physical properties.

When the organic peroxide is used as the vulcanizing agent, it is preferred to use the aforesaid vulcanization assisting agent in combination. The vulcanization assisting agent is used in an amount of 0.5 to 2 mol, preferably about 1 tool, based on 1 mol of the organic peroxide used.

When the vulcanization is carried out not using the vulcanizing agent but using electron rays, the unvulcanized molded rubber compound described below is irradiated with electron rays having energy of 0.1 to 10 MeV (mega-electronvolt), preferably 0.3 to 2 MeV, so that the ray-absorption amount is 0.5 to 35 Mrad (megarad), preferably 0.5 to 10 Mrad.

The unvulcanized rubber compound is prepared by the following process. That is, the higher α-olefin copolymer [A], the diene rubber [B], a filler, a softening agent are kneaded in a mixing device such as a Banbury mixer at a temperature of 80° to 170° C. for 3 to 10 minutes, to the resulting kneadate is then added the vulcanizing agent and if necessary the vulcanization accelerator or the vulcanization assisting agent, and the resulting mixture is kneaded at a roll temperature of 40° to 80° C. for 5 to 30 minutes using a roll such as an open-roll. Thereafter, the resulting mixture is rolled to prepare a rubber compound in the form of a ribbon or a sheet.

When a natural rubber is used as the diene rubber [B], it is preferred that the natural rubber is beforehand roughly kneaded, whereby miscibility of the natural rubber with the rubber reinforcing agent and the filler can be improved.

The rubber compound prepared as above is then molded into a desired form by means of an extrusion molding machine, a calender roll or a press. Vulcanization of the rubber compound is carried out simultaneously with the molding process or thereafter. That is, the rubber compound or its molded product is introduced into a vulcanizing vessel and vulcanized therein by heating it at a temperature of 150° to 270° C. for 1 to 30 minutes or by irradiating it with electron rays in the manner mentioned before, to obtain a vulcanized product. The vulcanization process may be carried out using a mold or not using a mold. When a mold is not used, molding and vulcanization are generally conducted continuously. For heating the rubber compound or its molded product in the vulcanizing vessel, the vessel is heated using hot air, glass bead fluidized bed, UHF (ultrahigh frequency electromagnetic wave), steam, etc. As a matter of course, when the vulcanization is carried out by irradiation with electron rays, a rubber compound containing no vulcanizing agent is usually used.

The vulcanized rubber product prepared as above can be used for automotive industrial parts such as tires, rubber vibration insulators and cover materials for vibrating portions; industrial rubber products such as rubber rolls and belts; electrical insulators; civil engineering and building materials; rubberized fabrics; etc. If the vulcanized product is applied to uses in which the dynamic fatigue resistance is especially required, remarkable performance is exhibited, and it can be favorably used for tire side walls, rubber vibration insulators, rubber rolls, belts, wiper blades, various packings, etc.

Next, the rubber composition for tire tread according to the present invention is described.

The rubber composition for tire tread according to the present invention is comprises the higher α-olefin copolymer [A] and the diene rubber [B].

The higher α-olefin copolymer [A] for use in this rubber composition for tire tread has an intrinsic viscosity [η], as measured in a decalin solvent at 135° C., of 1.0 to 10.0 dl/g, preferably 1.0 to 7.0 dl/g.

A weight ratio ([A]/[B]) of the higher α-olefin copolymer [A] to the diene rubber [B], which constitute the rubber composition for tire tread according to the present invention, is in the range of 1/99 to 50/50, preferably 5/95 to 30/70.

The rubber composition for tire tread can be prepared by conventionally known mixing methods for rubber-like polymers, e.g., those using mixers such as a Banbury mixer. In this invention, ordinary rubber compounding ingredients are used in the rubber compounding process. Examples of such rubber compounding ingredients include rubber reinforcing agents such as carbon black and finely-ground silicic acid; softening agents; fillers such as light calcium carbonate, heavy calcium carbonate, talc, clay and silica; tackifiers; waxes; bonding resins; zinc oxide; antioxidants; ozone crack inhibitors; processing aids and vulcanization promoters. These compounding ingredients may be used singly or in combination The rubber reinforcing agent is used in an amount of 30 to 150 parts by weight, preferably 40 to 100 parts by weight, based on 100 parts by weight of the starting rubber. If the amount thereof is too large, the rolling resistance tends to be reduced though the damping properties on the wet road surface (wet skid) is enhanced. To the contrary, if the amount thereof is too small, the abrasion resistance tends to be reduced.

The vulcanization promoter is added preferably in the second step of the compounding process. The operation of the second step of the compounding process is preferably carried out by means of a Banbury mixer usually having a temperature of not higher than about 60° C. The vulcanization promoter may be sulfur or a mixture of sulfur and various accelerators.

A vulcanized product of the rubber composition for tire tread according to the present invention can be prepared by a vulcanization process conventionally used, that is, by heating a blend of the higher α-olefin copolymer [A], the diene rubber [B] and other compounding ingredients at a temperature of 150° to 200° C. for 5 to 60 minutes to vulcanize it.

The rubber composition using the higher α-olefin copolymer [A] other than the above-mentioned one includes a higher α-olefin copolymer rubber composition which comprises the higher α-olefin copolymer [A] and an ethylene/α-olefin copolymer rubber [C], a weight ratio ([A]/[C]) of said higher α-olefin copolymer [A] to said ethylene/α-olefin copolymer rubber [C] being in the range of 1/99 to 90/10.

The ethylene/α-olefin copolymer rubber [C] is essentially formed from ethylene and an α-olefin, but it may further contain a-polyene component as its constituent.

The α-olefin used herein is an α-olefin of 3 to 6 carbon atoms, and examples thereof include propylene, 1-butene, 1-pentene, 4-methyl-1-pentene and 1-hexene. Of these, preferably used are propylene and 1-butene. A molar ratio of ethylene to the α-olefin (ethylene/α-olefin), which constitute the ethylene/α-olefin copolymer rubber [C], is in the range of 50/50 to 95/5, preferably 55/45 to 93/7, more preferably 60/40 to 91/9.

Preferable polyene component used herein is a non-conjugated polyene, and examples thereof include 1,4-hexadiene, 5-ethylidene-2-norbornene, 5-vinyl-2-norbornene, 5-isopropenyl-2-norbornene and dicylopentadiene. Of these, preferably used are 5-ethylidene-2-norbornene and dicyclopentadiene. The content of the non-conjugated polyene component is, in terms of iodine value, usually 1 to 50, preferably 4 to 40, more preferably 6 to 30, and in terms of % by tool, usually 0.1 to 10% by tool, preferably 0.5 to 7% by mol, more preferably 1 to 5% by mol.

The ethylene/α-olefin copolymer rubber [C] has an intrinsic viscosity [η], as measured in a decalin solvent at 135° C., of 0.8 to 5 dl/g, preferably 0.9 to 4 dl/g, more preferably 1.0 to 3 dl/g. If the ethylene/α-olefin copolymer rubber [C] having the above-defined intrinsic viscosity [η] is used, a higher (α-olefin copolymer rubber composition capable of providing a molded product excellent in not only processability but also strength can be obtained.

In this rubber composition, a weight ratio ([A]/[C]) of the higher α-olefin copolymer [A] to the ethylene/α-olefin copolymer rubber [C] is in the range of 1/99 to 90/10, preferably 2/98 to 80/20, more preferably 2/98 to 70/30.

To this rubber composition may be added reinforcing agents such as carbon black (e.g., SRF, GPF, FEF, HAF, ISAF, SAF, FT and MT) and finely-ground silicic acid; and fillers such as light calcium carbonate, heavy calcium carbonate, talc, clay and silica. The amount and the kind of the rubber reinforcing agent or the filler used can be appropriately determined according to use of the resulting rubber composition, but the amount thereof is generally at most 300 parts by weight, preferably at most 200 parts by weight, based on 100 parts by weight of the total amount of the higher α-olefin copolymer [A] and the ethylene/α-olefin copolymer rubber [C].

This rubber composition can be used in the unvulcanized form, but if it is used in the vulcanized form, the characteristics of the rubber composition are best exhibited. That is, the higher α-olefin copolymer [A] for forming the rubber composition of the present invention serves to enhance weathering resistance, ozone resistance, etc. of the vulcanized product, and the ethylene/α-olefin copolymer rubber [C] serves to enhance strength, etc. of the vulcanized product, and therefore a vulcanized product excellent in strength, vibration-damping properties and dynamic fatigue resistance can be obtained from this rubber composition.

A vulcanized product of this rubber composition can be prepared by the same vulcanization process as for the aforesaid higher α-olefin copolymer rubber composition of the present invention.

Further, a foamed material can be prepared from this rubber composition by adding a foaming agent which may be generally used for rubbers and if necessary a foaming assisting agent to the rubber composition. The foamed material thus obtained can be used for a heat insulating material, a cushioning material, a sealing material, etc. The foaming agent is used in an amount of 0.5 to 30 parts by weight, preferably 1 to 20 parts by weight, based on 100 parts by weight of the total amount of the higher α-olefin copolymer [A] and the ethylene/α-olefin copolymer rubber [C], whereby a foamed material having an apparent specific gravity of 0.03 to 0.7 can be prepared.

Since this rubber composition contains the higher α-olefin copolymer [A] and the ethylene/α-olefin copolymer rubber [C] in such a specific ratio therebetween as explained above, it is excellent in strength, heat resistance, weathering resistance, vibration-damping properties, vibration-insulating properties and dynamic fatigue resistance. Further, a vulcanized product showing such excellent properties can be formed from this rubber composition.

The vulcanized product obtained from this rubber composition shows such excellent properties as mentioned above, and hence it can be widely used for automotive industrial parts such as tires, rubber vibration insulators and cover materials for vibrating portions; industrial rubber products such as rubber rolls and belts; electrical insulators; civil engineering and building materials; rubberized fabrics; etc. When it is applied to uses in which the vibration-damping properties and the dynamic fatigue resistance are especially required, remarkable performance of the vulcanized rubber product is exhibited, and it can be favorably used for rubber vibration insulators, rubber rolls, belts, tires, wiper blades, etc.

The foamed material obtained from this rubber composition can be widely applied to heat insulating materials, cushioning materials, sealing materials, etc.

The rubber composition using the higher-α-olefin copolymer of the invention other than the above-mentioned ones includes a thermoplastic elastomer composition which may be partially crosslinked and comprises 90 to 40 parts by weight of the higher α-olefin copolymer [A] and 10 to 60 parts by weight of a crystalline polyolefin resin [D], the total amount of said components [A] and [D] being 100 parts by weight.

Preferable crystalline polyolefin resin [D] for use in the thermoplastic elastomer composition is made of a crystalline high-molecular weight solid product obtained by polymerizing at least one monoolefin by a high pressure process or a low pressure process. Examples of such resin include isotactic and syndiotactic monoolefin polymer resins, and representatives of these resins are commercially available.

Examples of the olefins suitable for the crystalline polyolefin resin [D] include ethylene, propylene, 1-butene, 1-hexene, 1-pentene, 1-heptene, 2-methyl-1-pentene, 3-methyl-1-pentene, 4-methyl-1-pentene, 5-methyl-1-hexene, 1-octene, 1-decene and a mixture of two or more of these olefins (mixed olefin).

The crystalline polyolefin resin [D] may include random copolymers, block copolymers and other polymers or copolymers, provided that they are resinous.

The crystalline polyolefin resin [D] has a melt index (ASTM D 1238-65T, 230° C.) of 0.01 to 100 g/10, preferably 0.05 to 50 g/10 min.

The crystalline polyolefin resin [D] functions to improve flowability and heat resistance of the resulting composition.

In the thermoplastic elastomer composition, the crystalline polyolefin resin [D] is used in an amount of usually 10 to 60 parts by weight, preferably 20 to 25 parts by weight, based on 100 parts by weight of the total amount of the crystalline polyolefin resin [D] and the higher α-olefin copolymer [A].

If the crystalline polyolefin resin [D] is used in such an amount as defined above, an olefin thermoplastic elastomer composition excellent in both of elastomeric properties and molding processability can be obtained.

This thermoplastic elastomer composition may further contain a softening agent [E] and/or an inorganic filler [F], in addition to the higher α-olefin copolymer [A] and the crystalline polyolefin resin [D].

Suitable as the softening agent (E) are those conventionally used for rubbers.

Examples of the softening agent (E) include:
petroleum materials such as process oil, lubricating oil, paraffin, liquid paraffin, petroleum asphalt and vaseline;
coal tars such as coal tar and coal tar pitch;
fatty oils such as castor oil, linseed oil, rapeseed oil, soybean oil and coconut oil;
waxes such as tall oil, beeswax, carnauba wax and lanolin;
fatty acids and metallic salts thereof, such as ricinolic acid, palmitic acid, stearic acid barium stearate and calcium stearate;
synthetic polymer materials such as petroleum resin, coumarone-indene resin and atactic polypropylene;
ester plasticizers such as dioctyl phthalate, dioctyl adipate and dioctyl sebacate; and
others such as microcrystalline wax, factice, liquid polybutadiene, modified liquid polybutadiene and liquid thiokol.

The softening agent [E] is used in an amount of usually not more than 200 parts by weight, preferably 2 to 100 parts by weight, based on 100 parts by weight of the total amount of the higher α-olefin copolymer [A] and the crystalline polyolefin resin [D].

If the softening agent (E) is used in such an amount as defined above, a thermoplastic elastomer composition excellent in heat resistance and thermal aging resistance can be obtained.

Examples of the inorganic fillers [F] include calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bead and shirasu balloon.

The inorganic filler [F] is used in an amount of usually not more than 100 parts by weight, preferably 2 to 50 parts by weight, based on 100 parts by weight of the total amount of the higher α-olefin copolymer [A] and the crystalline polyolefin resin [D].

If the inorganic filler [F] is used in such an amount as defined above, a thermoplastic elastomer composition capable of providing a molded product excellent in elastomeric properties and molding processability can be obtained.

This thermoplastic elastomer composition may further contain an ethylene/α-olefin copolymer rubber which is prepared by the use of an α-olefin of 3 to 5 carbon atoms and an ethylene/α-olefin/non-conjugated diene copolymer rubber which is prepared by the use of an α-olefin of 3 to 5 carbon atoms, in addition to the higher α-olefin copolymer [A], the crystalline polyolefin resin [D], the softening agent [E] and the inorganic filler [F].

Examples of the ethylene/α-olefin copolymer rubbers include an ethylene/propylene copolymer rubber and an ethylene/1-butene copolymer rubber.

Examples of the ethylene/α-olefin/non-conjugated diene copolymer rubbers include an ethylene/propylene/5-ethylidene-2-norbornene copolymer rubber and an ethylene/propylene/dicylopentadiene copolymer rubber.

Such copolymer rubber is preferably used in an amount of 10 to 200 parts by weight, based on 100 parts by weight of the total amount of the higher α-olefin copolymer [A] and the crystalline polyolefin resin [D].

The thermoplastic elastomer composition may further contain known heat stabilizers, anti-aging agents, weathering stabilizers, antistatic agents and lubricants such as metallic soap and wax, with the proviso that the objects of the invention are not marred.

The thermoplastic elastomer composition as mentioned above can be obtained by dynamically heat-treating a mixture of the crystalline polyolefin resin [D], the higher α-olefin copolymer [A] and the optionally used components, i.e., any one of the softening agent [E], the inorganic filler [F], the ethylene/α-olefin copolymer rubber, the ethylene/α-olefin/non-conjugated diene copolymer rubber and others, in the presence or in the absence of an organic peroxide described below so as to be partially crosslinked.

The expression "dynamically heat-treating" means kneading in a molten state.

Examples of the organic peroxides include dicumyl peroxide, di-t-butyl peroxide, di-t-butylperoxy-3,3,5-trimethylcyclohexane, t-butyl hydroperoxide, t-butyl-cumyl peroxide, benzoyl peroxide, 2,5-dimethyl-2, 5-di (t-butylperoxy)hexyne-3, 2,5-dimethyl-2,5-di(benzoylperoxy)hexane, 2,5-dimethyl-2,5-mono(t-butylperoxy)-hexane and α,α-bis(t-butylperoxy-misopropyl)benzene. Of these, preferably used are dicumyl peroxide, di-t-butyl peroxide and di-t -butylperoxy-3,3,5-trimethylcyclohexane.

These organic peroxides are used singly or in combination. The organic peroxide is used in an amount of usually 0.02 to 3.0 parts by weight, preferably 0.05 to 1.0 part by weight, based on 100 parts by weight of the total amount of the higher α-olefin copolymer [A] and the crystalline polyolefin resin [D]. However, it is desired to determine the optimum amount of the organic peroxide in accordance with the physical property values required.

In the partial crosslinking treatment with the organic peroxide in the present invention, it is preferred to use crosslinking assisting agents or polyfunctional vinyl monomers in combination. Examples thereof include sulfur; quinonedioxime compounds such as p-quinonedioxime; methacrylate compounds such as polyethylene glycol methacrylate; allyl compounds such as diallyl phthalate and triallyl cyanurate; maleimide compounds; and divinylbenzene.

By the use of the above-mentioned crosslinking assisting agents or polyfunctional vinyl monomers, a uniform and mild crosslinking reaction can be expected.

The crosslinking assisting agent or the polyfunctional monomer is used in an amount of usually not more than 2.0 parts by weight, preferably 0.3 to 1.0 part by weight, based on 100 parts by weight of the total amount of the higher α-olefin copolymer [A] and the crystalline polyolefin resin [D].

For promoting decomposition of the organic peroxide, decomposition promoters may be used. Examples of the decomposition promoters include tertiary amines such as triethylamine, tributylamine, 2, 4,6-tri(dimethylamino)phenol; and salts of naphthenic acid salts with aluminum, cobalt, vanadium, copper, calcium, zirconium, manganese, magnesium, lead, mercury, etc.

The dynamic heat treatment is carried out preferably in a non-open apparatus, and preferably in an atmosphere of inert gas such as nitrogen gas or carbonic acid gas. The temperature for the heat treatment is in the range of from the melting point of the crystalline polyolefin resin [D] to 300° C., i.e., in the range of usually 150° to 250° C., preferably 170° to 225° C. The kneading time is in the range of usually 1 to 20 minutes, preferably 1 to 10 minutes. The shear force applied in the kneading is in the range of usually 10 to 100,000 sec$^{-1}$, preferably 100 to 50,000 sec$^{-1}$, in terms of shear rate.

As the kneading apparatus, a mixing roll, an intensive mixer (e.g., Banbury mixer), a kneader, a single-screw extruder, a twin-screw extruder are employable, and preferably used is a non-open kneading apparatus.

Through the dynamic heat treatment, a partially crosslinked or non-crosslinked thermoplastic elastomer composition comprising the higher α-olefin copolymer [A] and the crystalline polyolefin resin [D] can be obtained.

Since this thermoplastic elastomer composition contains the higher α-olefin copolymer [A] and the crystalline polyolefin resin [D] in such a specific ratio therebetween as defined above, it is excellent in mechanical properties such as tensile strength and elongation at break, properties inherent in rubbers such as elongation set and permanent compression set, and heat resistance, even if the composition is not crosslinked at all.

The partially crosslinked thermoplastic elastomer composition is superior to the conventional vulcanized rubbers in the mechanical properties-such as tensile strength and elongation at break and the properties inherent in rubbers.

Next, the higher α-olefin copolymer rubber molded product according to the present invention is described.

The higher α-olefin copolymer rubber molded product of the invention is a vulcanized product of the aforesaid higher α-olefin copolymer of the present invention, and the higher α-olefin copolymer before subjected to vulcanization has an intrinsic viscosity [η], as measured in decalin at 135° C., of 1.0 to 10 dl/g.

The higher α-olefin copolymer rubber molded product of the present invention is formed from the vulcanized product of the higher α-olefin copolymer as described above, but it may further contain a vulcanization assisting agent such as a metal activator, a compound having oxymethylene structure or a scorch retarder. Further, if additives such as rubber reinforcing agents, fillers, softening agents, anti-aging agents and processing aids are added to the higher α-olefin copolymer rubber molded product of the present invention, the characteristics of the product can be much more improved. Therefore, those additives are preferably used in the present invention.

The higher α-olefin copolymer rubber molded product of the invention is preferably prepared, for example, in the following manner.

That is, a vulcanizing agent is added to the aforesaid higher α-olefin copolymer, and the copolymer is vulcanized, whereby the higher α-olefin copolymer rubber molded product of the present invention can be obtained.

The vulcanization is carried out by adding the vulcanizing agent to the higher α-olefin copolymer. The addition of the vulcanizing agent is preferably made prior to the molding process. For vulcanizing the higher α-olefin copolymer, sulfur vulcanization and organic peroxide vulcanization are effectively used.

Examples of the sulfur-containing compounds and the vulcanization accelerators used for the sulfur vulcanization and the amounts of sulfur and thereof are the same as those described before with respect to the higher α-olefin copolymer of the present invention.

Examples of the organic peroxides and the vulcanization assisting agents used for the organic peroxide vulcanization and the amounts thereof are the same as those described before with respect to the higher α-olefin copolymer of the present invention.

In the preparation of the higher α-olefin copolymer rubber molded product of the present invention, it it preferred to further use vulcanization assisting agents such as a metal activator, a compound having oxymethylene structure and a scorch retarder in combination.

Examples of the metal activator include magnesium oxide, zinc white, zinc carbonate, zinc salt of higher fatty acid, minium, litharge and calcium oxide. The metal activator is used in an amount of usually 3 to 15 parts by weight, preferably 5 to 10 parts by weight, based on 100 parts by weight of the higher α-olefin copolymer.

The compound having oxymethylene structure and the scorch retarder are preferably added in order to cope with various processes for rubbers.

Examples of the compound having oxymethylene structure used in the present invention include ethylene glycol, diethylene glycol, polyethylene glycol, propylene glycol and polypropylene glycol. The compound having oxymethylene structure is used in an amount of usually 0.1 to 10 parts by weight, preferably 1 to 5 parts by weight, based on 100 parts by weight of the higher α-olefin copolymer.

As the scorch retarders, those conventionally known can be used, and examples thereof inlcude maleic anhydride and salicylic acid. The scorch retarder is used in an amount of usually 0.2 to 5 parts by weight, preferably 0.3 to 3 parts by weight, based on 100 parts by weight of the higher α-olefin copolymer.

The performance of the higher α-olefin copolymer molded product can be much more improved by adding thereto additives such as rubber reinforcing agents, fillers, softening agents, anti-aging agent's and processing aids. These additives may be appropriately mixed with the higher α-olefin copolymer prior to the vulcanization or thereafter.

Examples of the rubber reinforcing agents and the fillers and the amounts thereof are the same as those described before with respect to the higher α-olefin copolymer rubber composition of the present invention.

The anti-aging agent may be used in an amount of 0.1 to 5 parts by weight, preferably 0.5 to 3 parts by weight, based on 100 parts by weight of the higher α-olefin copolymer.

As the processing aids, those generally used for rubbers can be used. The processing aid may be used in an amount of not more than 10 parts by weight, preferably 1 to 5 parts by weight, based on 100 parts by weight of the higher α-olefin copolymer.

In addition, other kinds of rubbers such as natural rubbers, diene rubbers (e.g., SBR, IR and BR) and EPDM may be added to a composition for forming the higher α-olefin copolymer rubber molded product.

The higher α-olefin copolymer rubber molded product of the present invention can be obtained by preparing a rubber compound and molding the compound, for example, in the following manner. That is, the higher α-olefin copolymer and if necessary additives such as reinforcing agents, fillers and softening agents are kneaded in a mixing device such as a Banbury mixer at a temperature of 80° to 170° C. for 3 to 10 minutes, then to the resulting kneadate is added the vulcanizing agent and if necessary the vulcanization accelerator and the vulcanization assisting agent, and the mixture is kneaded using rolls such as open-rolls at a roll temperature of 40° to 80° C. for 5 to 30 minutes. Thereafter, the resulting mixture is rolled to prepare a rubber compound in the form of a ribbon or a sheet.

If the higher α-olefin copolymer and the additives are directly fed to an extruder heated at about 80° to 100° C. and allowed to reside therein for about 0.5 to 5 minutes, a rubber compound in the form of pellets can be prepared.

The rubber compound thus obtained is then subjected to molding and vulcanization by the use of a press molding machine, a transfer molding machine, an injection molding machine, a roller machine, a calendering machine, an extruder, etc. according to use of the final product, to give a higher α-olefin copolymer rubber molded product. The higher α-olefin copolymer rubber molded product includes molded products for wiper blades, rolls, belts and vibration insulators.

The wiper blade rubber molded product can be obtained by subjecting the rubber compound prepared as above to molding and vulcanization by the use of a press molding machine, a transfer molding machine, an injection molding machine or the like.

The rubber molded product for roll can be prepared by the following process. The rubber compound prepared as above is rolled by means of a roller machine, a calendering machine, an extruder or the like, and the rubber compound is wound up around a metallic core coated with an adhesive to give a roll of the rubber compound. Then, the roll is tightly wound up with a cloth helically, and both ends of the roll are applied with appropriate boards. Depending on cases, a wire may be densely wound up over the above cloth. The roll thus treated is then placed in a vulcanizer and heated at 130° to 220° C. to vulcanize the roll. After the vulcanized roll is completely cooled, the cloth and the wire are removed from the roll, and the roll is subjected to mechanical abrasive finishing.

The rubber molded product for roll thus obtained is excellent in both of thermal aging resistance and dynamic fatigue resistance (flexural fatigue resistance), and has a small change of elastic modulus within a wide temperature range of from a low temperature to a high temperature.

The rubber belt molded product can be obtained by molding the rubber compound as above prepared by means of a roller machine, a calendering machine, an extruder or the like to give a molded product in the form of a belt, and then heating the molded product at a temperature of 130° to 220° C. for 1 to 60 minutes to vulcanize it. Further, the rubber belt molded product can be obtained by subjecting the rubber compound to molding and vulcanization in a mold by the use of a press molding machine or an injection molding machine. In this case, the mold temperature is generally in the range of 130° to 220° C., and the period of time required for the vulcanization is in the range of 1 to 60 minutes.

The rubber belt molded product thus obtained is excellent in thermal aging resistance and dynamic fatigue resistance (flexural fatigue resistance), and has a small change of elastic modulus in a wide temperature range of from a low temperature to a high temperature.

The vibration-insulating rubber molded product can be obtained by subjecting the rubber compound as above prepared to molding and vulcanization by the use of a press molding machine, a transfer molding machine, an injection molding machine or the like.

The vibration-insulating rubber molded product thus obtained is excellent in both of thermal aging resistance and dynamic fatigue resistance (flexural fatigue resistance).

The molded products are prepared from the rubber compound or the higher α-olefin copolymer only as described above. The rubber compound may be laminated with a material conventionally used so as to obtain a higher α-olefin copolymer rubber molded product of composite which is much more enhanced in the thermal aging resistance and the dynamic fatigue resistance (flexural fatigue resistance).

For example, the rubber belt molded product as above prepared may be combined with a reinforcing material such as synthetic fabric, natural fabric, steel cord or glass cord to obtain a composite rubber belt.

The wiper blade rubber molded product as above prepared may be subjected to a surface treatment such as chlorination, bromination or fluorination, or the surface of the molded product may be coated with a resin such as polyethylene or filled with short fibers to reduce the friction coefficient, whereby performance of the wiper blade rubber molded product can be much more improved.

The vibration-insulating rubber molded product is often used as a composite with iron. When the vibration-insulating rubber molded product is required to be adhered to iron, commercially available adhesives can be used, whereby sufficient adhesion between the vibration-insulating rubber molded product and iron can be obtained. Of these adhesives, Chemrock 250, 253, etc. available from Road Far East Co. are favorably used.

The rubber molded product other than the above-mentioned higher α-olefin copolymer rubber molded products according to the present invention includes a conductive rubber molded product formed from a vulcanized product of a rubber composition comprising 100 parts by weight of the higher α-olefin copolymer which is used for the higher α-olefin copolymer rubber molded products of the present invention and 5 to 200 parts by weight of a conductivity imparting agent.

Examples of the conductivity imparting agent include those conventionally known such as carbon black, carbon fiber, metallic powder and metallic fiber. These conductivity imparting agents may be used singly or in combination. In this invention, carbon black is preferably used.

The conductivity imparting agent is used in an amount of usually 5 to 200 parts by weight, preferably 40 to 200 parts by weight, based on 100 parts by weight of the higher α-olefin copolymer.

The conductive rubber molded product may further contain assisting agents which may be used for vulcanization reaction, e.g., the aforesaid metal activator, compound having oxymethylene structure and scorch retarder.

If the aforementioned additives such as rubber reinforcing agents, fillers, softening agents, anti-aging agents and processing aids are comprised in the conductive rubber molded product, the moldability in the preparation of the conductive rubber molded product can be further improved. Therefore, such additives are preferably used in this invention.

The conductive rubber molded product is preferably prepared, for example, in the following manner.

That is, a vulcanizing agent is added to a rubber compound containing the higher α-olefin copolymer and the conductivity imparting agent, and the compound is vulcanized.

The vulcanization is carried out by adding a vulcanizing agent to the rubber compound containing the higher α-olefin copolymer and the conductivity imparting agent as described above, and the addition of the vulcanizing agent is preferably made prior to the molding process. For vulcanizing the higher α-olefin copolymer, the aforesaid sulfur vulcanization and organic peroxide vulcanization are effectively used.

In the preparation of the conductive rubber, a vulcanization assisting agent described below is preferably added to the higher α-olefin copolymer simultaneously with the addition of the vulcanizing agent.

Examples of the vulcanization assisting agent preferably used in combination with the vulcanizing agent include those of the aforesaid including metal activator, compound having oxymethylene structure and scorch retarder.

The compound having oxymethylene structure and the scorch retarder are preferably added in order to cope with various processes for rubbers.

The amounts of the metal activator, the compound having oxymethylene structure and the scorch retarder are the same as those described before with respect to the higher α-olefin copolymer rubber molded product of the present invention.

If the additives such as rubber reinforcing agents, fillers, softening agents, anti-aging agents and processing aids are contained in the conductive rubber molded product, the characteristics of the conductive rubber molded product can be further improved. These additives are appropriately mixed with the higher α-olefin copolymer either before or after the vulcanization.

Examples of the rubber reinforcing agents include finely-ground silicic acid and short fibers of cotton, polyester, nylon, aramid and glass.

Examples of the fillers include light calcium carbonate, heavy calcium carbonate, talc, clay and silica. The reinforcing agent and the filler are each used in an amount of usually at most 300 parts by weight, preferably at most 200 parts by weight, based on 100 parts by weight of the higher α-olefin copolymer.

As the softening agent, there can be used the aforesaid examples of the softening agent [E] which may be used for the thermoplastic elastomer composition if necessary. The amount of the softening agent can be appropriately selected according to use of the vulcanized product, but in general, the softening agent is used in an amount of at most 100 parts by weight, preferably at most 70 parts by weight, based on 100 parts by weight of the higher α-olefin copolymer.

If the anti-aging agent is added to the higher α-olefin copolymer, a life of the resulting conductive rubber molded product can be made longer. This is the same with the ordinary rubbers.

Examples of the anti-aging agents used herein include:

aromatic secondary amine stabilizers such as phenylnaphthylamine and N,N'-di-2-naphthylphenylenediamine;

phenol stabilizers such as dibutylhydroxytoluene and tetrakis[methylene(3,5-di-t-butyl-4-hydroxy)hydrocinnamate]methane;

thioether stabilizers such as bis[2-methyl-4-(3-n-alkylthiopropionyloxy)-5-t-butylphenyl]sulfide; and dithiocarbamate stabilizers such as nickel dibutyldithiocarbamate.

These anti-aging agents are used singly or in combination.

The anti-aging agent is used in an amount of usually 0.1 to 5 parts by weight, preferably 0.5 to 3 parts by weight, based on 100 parts by weight of the higher α-olefin copolymer.

As the processing aids, those used for processing ordinary rubbers can be employed. Examples thereof include ricinolic acid, stearic acid, palmitic acid, lauric acid, barium stearate, calcium stearate, zinc stearate, esters of these acids, higher fatty acids, salts thereof and esters thereof.

The processing aid is used in an amount of usually not more than 10 parts by weight, preferably 1 to 5 parts by weight, based on 100 parts by weight of the higher α-olefin copolymer.

In this invention, other kinds of rubbers such as natural rubbers, diene rubbers (e.g., SBR, IR and BR), EPDM and polyethylene chlorosulfonate may be added to a composition for forming the conductive rubber molded product.

The conductive rubber molded product of the invention can be obtained by preparing a rubber compound and then molding the compound, for example, in the following manner. That is, the higher α-olefin copolymer and if necessary additives such as reinforcing agents, fillers and softening agents are kneaded in a mixing device such as a Banbury mixer at a temperature of 80° to 170° C. for 3 to 10 minutes, then to the resulting kneadate is added the vulcanizing agent and if necessary the vulcanization accelerator and the vulcanization assisting agent, and the mixture is kneaded using rolls such as open-rolls at a roll temperature of 40° to 80° C. for 5 to 30 minutes. Thereafter, the resulting mixture is rolled to prepare a rubber compound in the form of a ribbon or a sheet.

Then, the rubber compound prepared as above is molded by a roller machine, a calendering molding machine, an extrusion or the like, and the resulting molded product is vulcanized by heating at 130° to 220° C. for 1 to 60 minutes, whereby a conductive rubber is formed.

Further, the conductive rubber can be obtained by subjecting the rubber compound obtained above to molding and vulcanization in a mold by the use of a press molding machine or an injection molding machine. In this case, the molding temperature is generally in the range of 130° to 220° C. and the period of time required for the vulcanization is in the range of 1 to 60 minutes.

The conductive rubber molded product thus obtained is excellent in both of dynamic fatigue resistance (flexural fatigue resistance) and conductivity.

Since the conductive rubber molded product is formed from a vulcanized product containing the specific higher α-olefin copolymer and the conductivity imparting agent in a specific ratio, it is excellent in both of dynamic fatigue resistance and conductivity.

EFFECT OF THE INVENTION

The higher α-olefin copolymer of the present invention contains a specific higher α-olefin, a specific aromatic ring-containing vinyl monomer and a specific non-conjugated diene in a specific ratio therebetween, and has an intrinsic viscosity [η] of specific value. Therefore, this higher α-olefin copolymer is excellent in not only weathering resistance, ozone resistance, thermal aging resistance, low-temperature characteristics, vibration-damping properties, dynamic fatigue resistance and mechanical strength but also processability, compatibility with aromatic ring-containing polymers such as SBR and covulcanizability therewith. Accordingly, a vulcanized product excellent in the above properties such as weathering resistance can be obtained from the higher α-olefin copolymer of the present invention.

According to the process of the present invention for preparing a higher α-olefin copolymer, the higher α-olefin copolymer having such excellent properties as mentioned above can be efficiently prepared in a high yield.

The higher α-olefin copolymer rubber composition of the present invention contains the specific higher α-olefin copolymer [A] and the specific diene rubber [B] in a specific ratio, and therefore the composition is excellent in not only processability, strength, weathering resistance, ozone resistance and dynamic fatigue resistance but also adhesion to fibers. From this higher α-olefin copolymer rubber composition, a vulcanized product having such excellent properties as mentioned above can be obtained.

The vulcanized product obtained from the higher α-olefin copolymer rubber composition of the present invention shows such excellent properties as mentioned above, and hence it can be widely used for automotive industrial parts such as tires, rubber vibration insulators and cover materials for vibrating portions, industrial rubber products such as rubber rolls and belts, electrical insulating materials, civil engineering and building materials and rubberized fabrics.

The rubber composition for tire tread according to the present invention contains the specific higher α-olefin copolymer [A] and the specific diene rubber [B] in a specific ratio, and therefore it is excellent in strength, abrasion resistance and damping properties on the wet road surface (wet skid) and has low rolling resistance. From this rubber composition, a vulcanized product having such excellent properties as mentioned above can be obtained.

The higher α-olefin copolymer rubber molded product of the present invention is formed from a vulcanized product of a copolymer comprising a specific higher α-olefin, a specific aromatic ring-containing vinyl monomer and a specific non-conjugated diene. Therefore, it is excellent in not only environmental aging resistance (thermal aging resistance, weathering resistance, ozone resistance) but also dynamic fatigue resistance (flexural fatigue resistance), and has a long life.

According to the invention, higher α-olefin copolymer rubber molded products which are most suitably used for wiper blades, rolls, belts and vibration insulators can be provided.

EXAMPLE

The present invention is further described below with reference to examples, but it should be construed that the invention is in no way limited to those examples.

Example 1

Preparation of a solid titanium catalyst component (a)

95.2 g of magnesium chloride anhydride, 442 ml of decane and 390.6 g of 2-ethylhexyl alcohol were reacted with each other under heating at 130° C. for 2 hours to give a homogeneous solution. To the solution was added 21.3 g of phthalic anhydride, and they were mixed and stirred at 130° C. for 1 hour to dissolve the phthalic anhydride in the homogeneous solution. The resulting homogeneous solution was cooled to a room temperature, and then 75 ml of the solution was dropwise added over 1 hour to 200 ml of titanium tetrachloride kept at −20° C. After the addition was completed, the temperature of the resulting mixture liquid was elevated to 110° C. over 4 hours. When the temperature of the mixture liquid reached 110° C. 5.22 g of diisobutyl phthalate was added thereto, and the mixture liquid was stirred for 2 hours at the same temperature. After the 2-hour reaction was completed, the mixture liquid was subjected to hot filtration to collect a solid portion. This solid portion was suspended in 275 ml of titanium tetrachloride, and the resulting suspension was reacted for 2 hours under heating at 110° C. After completion of the reaction, the suspension was again subjected to hot filtration to collect a solid portion. This solid portion was sufficiently washed with decane of 110° C. and hexane until free titanium compound in the washing liquid was not detected. The titanium catalyst component (a) prepared through the above operation was stored as its decane slurry, though a part of the component (a) was dried for the purpose of examining the catalyst composition. The solid titanium catalyst component (a) thus obtained had a composition essentially consisting of 2.5% by weight of titanium, 65% by weight of chlorine, 19% by weight of magnesium and 13.5% by weight of diisobutylphthalate.

Polymerization

Copolymerization of 1-hexene, 4-pheyl-1-butene and 7-methyl-1,6-octadiene was continuously carried out in a 4-liter glass polymerizer equipped with a stirring blade.

In detail, to the polymerizer were continuously fed from the top thereof a hexane solution of 1-hexene, 4-pheyl-1-butene and 7-methyl-1,6-octadiene at a feed rate of 2.1 l/hr so that the concentration of 1-hexene in the polymerizer was 132 g/l, the concentration of 4-phenyl-1-butene in the polymerizer was 39 g/l and the concentration of 7-methyl-1,6-octadiene was 10 g/l, a hexane slurry of the solid titanium catalyst component (a) as a catalyst at a feed rate of 0.4 l/hr so that the concentration of titanium in the polymerizer was 0.04 mmol/l, a hexane solution of triisobutylaluminum at a feed rate of 1 l/hr so that the concentration of aluminum in the polymerizer was 4 mmol/l, and a hexane solution of trimethylmethoxysilane at a feed rate of 0.5 l/hr so that the concentration of silane in the polymerizer was 1.3 mmol/l. At the same time, the resulting polymer solution was continuously drawn out from the bottom of the polymerizer so that the amount of the polymer solution in the polymerizer was constantly 2 liters. Further, to the polymerizer were continuously fed from the top thereof hydrogen at a feed rate of 0.8 l/hr and nitrogen at a feed rate of 50 l/hr. The copolymerization reaction was carried out at 50° C. by circulating hot water within a jacket equipped with outside of the polymerizer.

Subsequently, to the polymer solution drawn out from the bottom of the polymerizer was added a small amount of methanol to terminate the copolymerization reaction, and the polymer solution was introduced into a large amount of methanol to precipitate a copolymer. The copolymer was well washed with methanol and then dried at 130° C. for 24 hours under a reduced pressure, to obtain an 1-hexene/4-phenyl-1-butene/7-methyl-1,6-octadiene copolymer at a rate of 122 g/hr.

The copolymer thus obtained had a molar ratio of 1-hexene to 4-phenyl-1-butene of 75/25 (1-hexene/4-phenyl-1-butene), a content of 7-methyl-1,6-octadiene of 3.6% by mol, an iodine value of 9.4, and an intrinsic viscosity [$\eta$], as measured in decalin at 135° C., of 5.7 dl/g.

Examples 2-6

The procedures of Example 1 were repeated except that the higher $\alpha$-olefin and the polymerization conditions were varied to those set forth in Table 1, to prepare copolymers set forth in Table 1.

TABLE 2-continued

| Composition | Amount [part(s) by weight] |
|---|---|
| Sulfur | 0.45 |

1) trade name: Asahi #80, available from Asahi Carbon K.K.
2) trade name: Sunseller M, available from Sanshin Kagaku Kogyo K.K.
3) trade name: Sunseller TT, available from Sanshin Kagaku Kogyo K.K.

Further, the above-mentioned rubber compound was heated for 20 minutes by means of a press heated to 160° C. to prepare a vulcanized sheet. The vulcanized sheet was subjected to the following tests. The test items are as follows.

Test items

Tensile test, hardness test, ozone resistance test, and flexural test were carried out.

Test methods

The tensile test, hardness test, ozone resistance test and flexural test were carried out in accordance with JIS K 6301.

That is, tensile strength ($T_B$) and elongation ($E_B$) were measured in the tensile test, and JIS A hardness ($H_S$) was measured in the hardness test.

The ozone resistance test was conducted in an ozone testing vessel (static test, ozone concentration: 50 pphm,

TABLE 1

| | Ti Concentration mmol/l | Al Concentration mmol/l | Third Component | mmol/l | Hydrogen l/hr | Nitrogen l/hr | Higher α-olefin (a) | g/l |
|---|---|---|---|---|---|---|---|---|
| Ex 1 | 0.04 | 4.0 | TMMS | 1.3 | 0.8 | 50 | 1-hexene | 132 |
| Ex. 2 | 0.04 | 4.0 | TMMS | 1.3 | 0.8 | 50 | 1-hexene | 94 |
| Ex. 3 | 0.03 | 3.0 | TMMS | 1.0 | 2.0 | 50 | 1-hexene | 148 |
| Ex. 4 | 0.04 | 4.0 | TMMS | 1.3 | 0.8 | 50 | 1-octene | 143 |
| Ex. 5 | 0.04 | 4.0 | TMMS | 1.3 | 0.8 | 50 | 1-hexene | 81 |
| Ex. 6 | 0.04 | 4.0 | TMES | 1.3 | 1.0 | 50 | 1-hexene | 108 |
| Comp Ex. 1 | 0.03 | 3.0 | TMMS | 1.3 | | 50 | 1-hexene | 115 |

| | 4-phenyl-1-butene (b) g/l | 7-methyl-1,6-octadiene g/l | Yield g/hr | (a)/(b) mo/mol | 7-methyl-1,6-cotadiene mol/% | [$\eta$] dl/g | Iodine value |
|---|---|---|---|---|---|---|---|
| Ex 1 | 39 | 10 | 122 | 75/25 | 3.6 | 5.7 | 9.4 |
| Ex. 2 | 123 | 10 | 130 | 59/41 | 3.3 | 5.1 | 8.0 |
| Ex. 3 | 53 | 10 | 110 | 81/19 | 3.5 | 4.3 | 9.5 |
| Ex. 4 | 70 | 10 | 140 | 72/28 | 4.1 | 4.9 | 8.8 |
| Ex. 5 | 140 | 16 | 95 | 48/52 | 6.2 | 4.6 | 14.5 |
| Ex. 6 | 106 | 16 | 110 | 65/35 | 5.2 | 4.8 | 13.0 |
| Comp Ex. 1 | 0 | 10 | 110 | 100/0 | 3.4 | 5.0 | 10.0 |

Remarks:
TMMS: trimethylmethoxysilane
TMES: trimethylethoxysilane

Example 7

The 1-hexene/4-phenyl-1-butene/7-methyl-1,6-octadiene copolymer prepared in Example 1 was kneaded with additives set forth in Table 2 by the use of 8-inch open-rolls, to obtain an unvulcanized rubber compound. The unvulcanized rubber compound was evaluated on the processability. The result is set forth in Table 3.

TABLE 2

| Composition | Amount [part(s) by weight] |
|---|---|
| Copolymer | 100 |
| Stearic acid | 1 |
| Zinc white | 5 |
| ISAF carbon 1) | 50 |
| Vulcanization accelerator A 2) | 0.5 |
| Vulcanization accelerator B 3) | 0.3 | elongation rate: 20% temperature 40° C. time: 200 hours), and the vulcanized sheet was examined on the surface deterioration (presence or absence of crack occurrence).

In the flexural test, resistance to crack growth was examined by means of De Mattia flexometer. In detail, the vulcanized sheet was repeatedly flexed until a length of a crack reached 15 mm, and the number of flexure times was counted.

The results are set forth in Table 3.

Example 8

The procedures of Example 7 were repeated except that the 1-hexene/4-phenyl-1-butene/7-methyl-1,6-octadiene copolymer prepared in Example 2 was used in place of the 1-hexene/4-phenyl-1-butene/7-methyl-1,6-octadiene copolymer prepared in Example 1.

The results are set forth in Table 3.

Comparative Example 1

The procedures of Example 1 were repeated except that 4-phenyl-1-butene is not used and the copolymerization is conducted under the polymerization conditions set forth in Table 1, to prepare an 1-hexene/7-methyl-1,6-octadiene copolymer. Then, the procedures of Example 7 were repeated except that the 1-hexene/7-methyl-1,6-octadiene copolymer obtained above was used in place of the copolymer of Example 1.

The results are set forth in Table 3.

TABLE 3

|  | Example 7 | Example 8 | Comparative Example 1 |
|---|---|---|---|
| $T_B$ (kg/cm$^2$) | 143 | 149 | 165 |
| $E_B$ (%) | 430 | 390 | 550 |
| Ozone resistance (occurrence of carack) | None | None | None |
| $H_S$ | 62 | 72 | 54 |
| Flexural test (number of times to crack growth) | >10$^5$ | >10$^5$ | >10$^5$ |
| Processability (Note 1) | 5 | 5 | 5 |

(Note 1)
Evaluation on processability (5-class evaluation):
Bad ← 1 2 3 4 5 → Good
5: Cutting, tailing and rounding of the vulcanized sheet are easily made in the roll kneading procedure.
4: Cutting of the vulcanized sheet is difficult, but tailing and rounding thereof are easily made in the roll kneading procedure.
3: Cutting and tailing of the vulcanized sheet are difficult, but rounding thereof is easily made in the roll kneading procedure.
2: Cutting and tailing of the vulcanized sheet are difficult, but rounding thereof is made in the roll kneading procedure.
1: Cutting, tailing and rounding of the vulcanized sheet are all difficult in the roll kneading procedure.

Examples 9–11

The 1-hexene/4-phenyl-1-butene/7-methyl-1,6-octadiene copolymer prepared in Example 1 was kneaded with SBR (available from Nippon Geon Co., Ltd.) and additives set forth in Table 4 by the use of 8-inch open mill rolls, to obtain an unvulcanized rubber compound. The unvulcanized rubber compound was heated for 20 minutes by means of a press heated to 60° C., and the resulting vulcanized sheet was evaluated on the vulcanization properties.

The results are set forth in Table 5.

TABLE 4

| Composition | Example 9 | Example 10 | Example 11 |
|---|---|---|---|
| Copolymer | 25 | 50 | 75 |
| SBR[1] | 75 | 50 | 25 |
| Steraric acid | 1.5 | 1.5 | 1.5 |
| Zinc oxide | 3 | 3 | 3 |
| HAF carbon[2] | 50 | 50 | 50 |
| Naphthene oil[3] | 5 | 5 | 5 |
| Vulcanizsing accelerator | 1 | 1 | 1 |
| Sulfur | 1.75 | 1.75 | 1.75 |

1) trade name: Nipole 1502, available from Nippon Geon Co. Ltd.
2) trade name: Asahi #80, available from Asahi Carbon K.K.
3) trade name: Sunsen 4240, available from Nippon Sun Petroleum K.K.
4) trade name: Sunseller CN, available from Sanshin Kagaku Kogyo K.K.
The unit of each value in Table 4 is "part(s) by weight".

Comparative Examples 2–4

The procedures of any one of Examples 9 to 11 were repeated except that the 1-hexene/7-methyl-1,6-octadiene copolymer of Comparative Example 1 was used in place of the copolymer used in Examples 9 to 11.

The results are set forth in Table 5.

TABLE 5

|  | Ex. 9 | Ex. 10 | Ex. 11 | Comp. Ex. 2 | Comp. Ex. 3 | Comp. Ex. 4 |
|---|---|---|---|---|---|---|
| $T_B$ (Kg/cm$^2$) | 228 | 163 | 144 | 196 | 150 | 134 |
| $E_B$ (%) | 420 | 400 | 410 | 350 | 310 | 390 |

Example 12

The polymerization was carried out under the same conditions as in Example 1 to obtain a 1-hexene/4-phenyl-1-butene/7-methyl-1,6-octadiene copolymer at a rate of 122 g/hr.

The copolymer thus obtained had a molar ratio of 1-hexene to 4-phenyl-1-butene of 75/25 (1-hexene/4-phenyl-1-butene), an iodine value of 9.4, and an intrinsic viscosity [η], as measured in decalin at 135° C., of 5.7 dl/g.

The polymerization conditions are set forth in Table 6.

TABLE 6

|  | Copolymer 1-a | Copolymer 1-b | Copolymer 1-c |
|---|---|---|---|
| Ti Concentration [mmol/l] | 0.04 | 0.04 | 0.04 |
| Al Concentration [mmol/l] | 4.0 | 4.0 | 4.0 |
| Third Component | TMMS | TMES | TMMS |
| [mmol/l] | 1.3 | 1.3 | 1.3 |
| Hydrogen [l/hr] | 0.8 | 0.8 | 0.8 |
| Nitrogen [l/hr] | 50 | 50 | 50 |
| Higher α-olefin | 1-hexene | 1-hexene | 1-octene |
| (a) [g/l] | 132 | 81 | 143 |
| Aromatic ring-containing vinyl monomer | 4PB1 | 4PB1 | 4PB1 |
| (b) [g/l] | 39 | 140 | 70 |
| MOD [ml] | 10 | 16 | 10 |
| Temperature [°C.] | 50 | 50 | 50 |
| Yield of copolymer [g/hr] | 122 | 95 | 140 |
| (a)/(b) [molar ratio] | 75/25 | 48/52 | 72/28 |
| MOD [% by mol] | 3.5 | 6.2 | 4.1 |
| [η] [dl/g] | 5.7 | 4.6 | 4.9 |

Remarks:
Al: triisobutylaluminum
TMMS: trimethylmethoxysilane
TMES: trimethylethoxysilane
MOD: 7-methyl-1,6-octadiene
4PB1: 4-phenyl-1-butene

Preparation of a vulcanized rubber

The 1-hexene/4-phenyl-1-butene/7-methyl-1,6-octadiene copolymer (1-a) prepared above as the higher α-olefin copolymer rubber [A] and a commercially available natural rubber (RSS1, product of Malaysia) as the diene rubber [B] were mixed with additive set forth in Table 7, to obtain an unvulcanized rubber compound.

In the above procedure, the natural rubber was roughly kneaded by means of open-rolls adjusted at 40° C. in a conventional manner to have a Mooney viscosity [ML$_{1+4}$(100° C.)] of 60. Then, the copolymer (1-a), the roughly kneaded natural rubber (2-a), zinc white, a stearic acid, HAF carbon and a naphthenic oil were kneaded for 4 minutes in a 4.3-liter Banbury mixer (produced by Kobe Seiko K.K.), and the resulting kneadate was allowed to stand for 1 day at room temperature.

To the kneadate thus obtained were added vulcanization accelerators (DPG, CBZ), and they were kneaded by means of open-rolls (front roll/back roll: 50/60° C., 16/18 rpm) to obtain a rubber compound.

TABLE 7

| Composition | Amount [part(s) by weight] |
| --- | --- |
| Copolymer | 30 |
| Natural rubber | 70 |
| Stearic acid | 1 |
| Zinc white | 5 |
| HAF carbon 1) | 50 |
| Naphthenic oil 2) | 5 |
| Sulfur | 2.2 |
| Vulcanization accelerator DPG 3) | 1 |
| Vulcanization accelerator CBZ 4) | 0.5 |

1) trade name: Shiest H, available from Tokai Carbon K.K.
2) trade name: Sunsen 4240, available from Nippon Sun Petroleum K.K.
2) trade name: Sunseller D, available from Sanshin Kagaku Kogyo K.K.
3) trade name: Sunseller CM, available from Sanshin Kagaku Kogyo K.K.

The rubber compound obtained in the above was heated for 20 minutes by means of a press heated to 160° C. to prepare a vulcanized sheet. The vulcanized sheet was subjected to the following tests. The test items are as follows.

Test items

Tensile test, hardness test, ozone resistance test, flexural test and adhesion test to a polyester code were carried out.

Test methods

The tensile test, hardness test, ozone resistance test and flexural test were conducted in accordance with the aforesaid methods of JIS K 6301.

The adhesion test was carried out in accordance with the test described in Japanese Patent Laid-Open Publication No. 13779/1983. In detail, the H adhesion strength was measured in accordance with ASTM D 2138, and was determined as an adhesion force based on the length of 100 mm of the polyester code drawn out.

The results are set forth in table 8

Example 13

The procedures of Example 12 were repeated except that the amounts of the copolymer (1-a) and the natural rubber (2-a) were varied to 50 parts by weight and 50 parts by weight, respectively.

The results are set forth in table 8

Example 14

The procedures of Example 12 were repeated except that the amounts of the copolymer (1-a) and the natural rubber (2-a) were varied to 70 parts by weight and 30 parts by weight, respectively.

The results are set forth in Table 8.

Comparative Example 5

The procedures of Example 12 were repeated except that the copolymer (1-a) was not used but the natural rubber (2-a) was used singly in an amount of 100 parts by weight.

The results are set forth in Table 8.

Comparative Example 6

The procedures of Example 12 were repeated except that the natural rubber (2-a) was not used but the copolymer (1-a) was used singly in an amount of 100 parts by weight.

The results are set forth in Table 9.

Comparative Example 7

The procedures of Example 13 were repeated except that an ethylene/propylene/5-ethylidene-2-norbornene (EPDM, ethylene content: 70% by mol, [η] as measured in decalin at 135° C.: 2.5 dl/g, iodine value: 20) was used in place of the copolymer (1-a).

The results are set forth in Table 9.

Example 15

The procedures of Example 12 were repeated except that SBR [(2-b), trade name: Nipole 1502, available from Nippon Geon Co., Ltd. ] was used in place of the natural rubber (2-a).

The results are set forth in Table 9.

Comparative Example 8

The procedures of Example 15 were repeated except that the copolymer (1-a) was not used but the SBR (2-b) was used singly in an amount of 100 parts by weight.

The results are set forth in Table 9.

Example 16

The procedures of Example 12 were repeated except that an isoprene rubber [(2-c), trade name: Nipole IR 2200, available from Nippon Geon Co., Ltd. ]was used in place of the natural rubber (2-a).

The results are set forth in Table 10.

Comparative Example 9

The procedures of Example 16 were repeated except that the copolymer (1-a) was not used but the isoprene rubber (2-c) was used singly in an amount of 100 parts by weight.

The results are set forth in Table 10.

Example 17

The procedures of Example 12 were repeated except that BR [(2-d), trade name: Nipole BR 1220, available from Nippon Geon Co., Ltd.] was used in place of the natural rubber (2-a).

The results are set forth in Table 10.

Comparative Example 10

The procedures of Example 17 were repeated except that the copolymer (1-a) was not used but the BR (2-d) was used singly in an amount of 100 parts by weight.

The results are set forth in Table 10.

Example 18

The procedures of Example 12 were repeated except that the 1-hexene/4-phenyl-1-butene/7-methyl-1,6-octadiene copolymer (1-b) which was obtained by the same copolymerization as in Example 12 except for varying the polymerization conditions to those shown in Table 6 was used in place of the copolymer (1-a).

The results are set forth in Table 11.

Example 19

The procedures of Example 12 were repeated except that the 1-octene/4-phenyl-1-butene/7-methyl-1,6-octadiene copolymer (1-c) which was obtained by the same copolymerization as in Example 12 except for varying the higher α-olefin and the polymerization conditions to those shown in Table 6 was used in place of the copolymer (1-a).

The results are set forth in Table 11.

Example 20

The procedures of Example 12 were repeated except that a mixed diene rubber comprising 50 parts by weight of the natural rubber (2-a) and 20 parts by weight of the SBR (2-b) was used in place of 70 parts by weight of the natural rubber (2-a).

The results are set forth in Table 11.

Example 21

The procedures of Example 12 were repeated except that a mixed diene rubber comprising 50 parts by weight of the natural rubber (2-a) and 20 parts by weight of the BR (2-d) was used in place of 70 parts by weight of the natural rubber (2-a).

The results are set forth in Table 11.

TABLE 8

| | Ex. 12 | Ex. 13 | Ex. 14 | Comp. Ex. 5 |
|---|---|---|---|---|
| Higher α-olefin copolymer [A] | 1-a | 1-a | 1-a | — |
| Diene rubber [B] | 2-a | 2-a | 2-a | 2-a |
| $T_B$ (kgf/cm$^2$) | 210 | 157 | 138 | 248 |
| $E_B$ (%) | 400 | 370 | 420 | 440 |
| $H_S$ | 55 | 53 | 51 | 59 |
| Ozone resistance (surface condition) | no crack | no crack | no crack | cracked |
| Flexural test (number of times to crack growth) | >10$^5$ | >10$^5$ | >10$^5$ | >10$^5$ |
| H adhesion strength (kg/cm) | 18.5 | 17.4 | 16.9 | 21.1 |

TABLE 9

| | Comp. Ex. 6 | Comp. Ex. 7 | Ex. 15 | Comp. Ex. 8 |
|---|---|---|---|---|
| Higher α-olefin copolymer [A] | 1-a | EPDM | 1-a | — |
| Diene rubber [B] | — | 2-a | 2-b | 2-b |
| $T_B$ (kgf/cm$^2$) | 130 | 160 | 205 | 280 |
| $E_B$ (%) | 470 | 490 | 400 | 450 |
| $H_S$ | 55 | 66 | 66 | 66 |
| Ozone resistance surface condition) | no crack | no crack | no crack | many cracks |
| Flexural test (number of times to crack growth) | >10$^5$ | 3 × 10$^3$ | >10$^5$ | 2 × 10$^4$ |
| H adhesion strength (kg/cm) | 16.2 | 4.9 | 19.2 | 20.5 |

TABLE 10

| | Ex. 16 | Comp. Ex. 9 | Ex. 17 | Comp. Ex. 10 |
|---|---|---|---|---|
| Higher α-olefin copolymer [A] | 1-a | — | 1-a | — |
| Diene rubber [B] | 2-c | 2-c | 2-d | 2-d |
| $T_B$ (kgf/cm$^2$) | 146 | 228 | 183 | 240 |
| $E_B$ (%) | 450 | 440 | 470 | 450 |
| $H_S$ | 54 | 57 | 53 | 57 |
| Ozone resistance surface condition) | no crack | cracked | no crack | cracked |
| Flexural test (number of times to crack growth) | >10$^5$ | >10$^5$ | >10$^5$ | >10$^5$ |
| H adhesion strength (kg/cm) | 17.6 | 18.6 | 16.8 | 17.6 |

TABLE 11

| | Ex. 18 | Ex. 19 | Ex. 20 | Ex. 21 |
|---|---|---|---|---|
| Higher α-olefin copolymer [A] | 1-b | 1-c | 1-a | 1-a |
| Diene rubber [B] | 2-a | 2-a + 2-b | 2-a + 2-d | |
| $T_B$ (kgf/cm$^2$) | 206 | 177 | 214 | 193 |
| $T_B$ (%) | 480 | 440 | 470 | 430 |
| $H_S$ | 55 | 51 | 55 | 53 |
| Ozone resistance (surface condition) | no crack | no crack | no crack | no crack |

TABLE 11-continued

| | Ex. 18 | Ex. 19 | Ex. 20 | Ex. 21 |
|---|---|---|---|---|
| Flexural test (number of times to crack growth) | >10$^5$ | >10$^5$ | >10$^5$ | >10$^5$ |
| H adhesion strength (kg/cm) | 16.9 | 17.1 | 18.5 | 17.7 |

Examples 22–27, Comparative Examples 11 and 12

Any of the copolymers (1-a), (1-b) and (1-c) used in Examples 12, 18 or 19, respectively, was mixed with additives set forth in table 12, and each of the resulting mixtures was kneaded by means of 8-inch open-rolls and vulcanized at 150° C. for 20 minutes to obtain vulcanized products. The vulcanized products were measured on the physical properties.

The amounts of the rubber compositions in Table 12 are based on part(s) by weight. The properties of the rubbers were evaluated by the following test methods.

That is, the strength was evaluated by tensile strength ($T_B$), the abrasion resistance was evaluated by Lambourn's method, damping properties on the wet road surface (wet skid) were evaluated by a value of tanδ measured by a spectrometer at 0° C. and the coiling resistance was evaluated by a value of tanδ measured by a spectrometer at 50° C.

Test methods (1) The tensile strength ($T_B$) was measured in accordance with JIS K 6301.

(2) The Lambourn abrasion was measured by the use of a Lambourn abrasion tester produced by Iwamoto Seisakusho K.K. under the following conditions.

Measuring conditions:
load: 3 kg
peripheral speed of sample: 150 m/min peripheral speed of grinding wheel: 100 m/min (3) The value of tanδ was measured by the use of a dynamic spectrometer produced by Reometrics Co., Ltd. under the following conditions.

Measuring conditions:
shear strain: 0.5%
frequency: 15 Hz

TABLE 12

| | Ex. 22 | Ex. 23 | Ex. 24 | Ex. 25 |
|---|---|---|---|---|
| Higher α-olefin copolymer [A] | | | | |
| 1-a | 10 | — | — | 5 |
| 1-b | — | 10 | — | — |
| 1-c | — | — | 10 | — |
| Diene rubber [B] | | | | |
| NR[1] | 90 | 90 | 90 | 95 |
| SBR[2] | — | — | — | — |
| Carbon black (N339) | 50 | 50 | 50 | 50 |
| Zinc white | 5 | 5 | 5 | 5 |
| Stearic acid | 2 | 2 | 2 | 2 |
| Accelerator NS[3] | 1.5 | 1.5 | 1.5 | 1.5 |
| Sulfur | 1.5 | 1.5 | 1.5 | 1.5 |
| $T_B$ (kgf/cm$^2$) | 215 | 232 | 198 | 196 |
| Lambourn abrasion | 0.061 | 0.052 | 0.067 | 0.050 |
| tanδ (0° C.) | 0.27 | 0.28 | 0.28 | 0.24 |
| tanδ (50° C.) | 0.18 | 0.18 | 0.19 | 0.18 |

1) RSS #3
2) Nipole 1502, available from Nippon Synthetic Rubber K.K.
3) N-t-butyl-2-benzothiazylsulfenamide

TABLE 13

|  | Ex. 26 | Ex. 27 | Comp. Ex. 11 | Comp. Ex. 12 |
|---|---|---|---|---|
| Higher α-olefin copolymer [A] | | | | |
| 1-a | 20 | 10 | — | 60 |
| 1-b | — | — | — | — |
| 1-c | — | — | — | — |
| Diene rubber [B] | | | | |
| NR[1] | 80 | 55 | 100 | 40 |
| SBR[2] | — | 35 | — | — |
| Carbon black (N339) | 50 | 50 | 50 | 50 |
| Zinc white | 5 | 5 | 5 | 5 |
| Stearic acid | 2 | 2 | 2 | 2 |
| Accelerator NS[3] | 1.5 | 1.5 | 1.5 | 1.5 |
| Sulfur | 1.5 | 1.5 | 1.5 | 1.5 |
| $T_B$ (kgf/cm$^2$) | 192 | 228 | 242 | 140 |
| Lambourn abrasion | 0.071 | 0.051 | 0.045 | 0.082 |
| tanδ (0° C.) | 0.30 | 0.28 | 0.15 | 0.43 |
| tanδ (50° C.) | 0.22 | 0.10 | 0.10 | 0.21 |

1) RSS #3
2) Nipole 1502, available from Nippon Synthetic Rubber K.K.
3) N-t-butyl-2-benzothiazylsulfenamide Wiper blade rubber molded product

Example 28

The same copolymer (1-a) as used in Example 12 was mixed with additives set forth in Table 14 to obtain an unvulcanized rubber compound.

In the above procedure, the higher α-olefin copolymer (1-a), zinc white, a stearic acid and ISAF carbon were kneaded for 5 minutes in a 4.3-liter Banbury mixer (produced by Kobe Seiko K.K.), and the resulting kneadate was allowed to stand for 1 day at room temperature.

To the kneadate thus obtained were added vulcanization accelerators and sulfur, and they were kneaded by means of open-rolls to obtain a rubber compound. The rolls used herein had a front roll surface temperature of 50° C. and a back roll surface temperature of 60° C. The number of rotations of the front roll was 16 rpm, and that of the back roll was 18 rpm.

TABLE 14

| Composition | Amount [part(s) by weight] |
|---|---|
| Higher α-olefin copolymer | 100 |
| Stearic acid | 3 |
| Zinc white | 10 |
| ISAF carbon black 1) | 50 |
| Sulfur | 0.5 |
| Vulcanization accelerator 2) | 0.5 |
| Vulcanization accelerator 3) | 0.3 |

1) trade name: Asahi #80, available from Asahi Carbon K.K.
2) trade name: Nocseller M, available from Ouchi Shinko Kagaku Kogyo K.K.
3) trade name: Nocseller TT, available from Ouchi Shinko Kagaku Kogyo K.K.

The rubber compound obtained above was heated for 30 minutes by means of a press heated to 160° C. to prepare a vulcanized sheet. The vulcanized sheet was subjected to the following tests. The test items are as follows.

Test items

Tensile test, hardness test, aging test, ozone resistance test, flexural test and weathering test were carried out.

Test method

The tensile test, hardness test, aging test, ozone resistance test and flexural test were carried out in accordance with JIS K 6301.

In detail, tensile strength ($T_B$), elongation ($E_B$) and tear strength ($T_R$) were measured in the tensile test, and JIS A hardness ($H_S$) was measured in the hardness test.

The aging test was conducted by heating the vulcanized sheet with hot air of 100° C. for 70 hours. In this test, retentions of physical properties of the vulcanized product before aging, i.e., retention of tensile strength $A_R(T_B)$ and retention of elongation $A_R(E_B)$, were measured.

The ozone resistance test was conducted in an ozone testing vessel (static test, ozone concentration: 50 pphm, elongation rate 20% temperature: 40° C. time 200 hours), and a period of time at the end of which crack occurred was measured.

In the flexural test, resistance to crack growth was examined by means of De Mattia flexometer. In detail, the vulcanized sheet was repeatedly flexed until a length of a crack reached 15 mm, and the number of flexure times was counted. Further, the specimen having been aged under heating with hot air of 120° C. for 70 hours was also subjected to the same flexural test.

The weathering test was carried out in accordance with JIS B 7753, and the vulcanized sheet was measured on retention of tensile strength $A_R(T_B)$ and retention of elongation $A_R(E_B)$ after the sunshine weatherometer exposure time of 1,000 hours.

The results are set forth in Table 17.

Example 29

The procedures of Example 28 were repeated except that the same copolymer (1-b) as used in Example 18 was used in place of the copolymer (1-a).

The results are set forth in Table 17.

Example 30

The procedures of Example 28 were repeated except that the same copolymer (1-c) as used in Example 19 was used in place of the copolymer (1-a).

The results are set forth in Table 17.

Comparative Example 13

The procedures of Example 28 were repeated except that an ethylene/propylene/5-ethylidene-2-norbornene copolymer having a molar ratio of ethylene to propylene of 67/33 (ethylene/propylene), a Mooney viscosity [$ML_{1+4}$ (121° C.)] of 63 and an iodine value of 20 was used in place of the copolymer (a-1), and the components used and the amounts thereof were varied to those set forth in Table 15.

The results are set forth in Table 17.

TABLE 15

| Composition | Amount [part(s) by weight] |
|---|---|
| EPDM | 100 |
| Stearic acid | 1 |
| Zinc white | 5 |
| FEF carbon black 1) | 80 |
| Process oil 2) | 20 |
| Triallyl isocyanate | 2.0 |
| Dicumyl peroxide | 6.8 |

1) trade name: Asahi #50, available from Asahi Carbon K.K.
2) trade name: Diana Process Oil PW-90, available from Idemitsu Kosan Co., Ltd.

Comparative Example 14

The procedures of Example 28 were repeated except that a natural rubber (RSS #3) and a chloroprene rubber (trade name: Neoprene WRT, available from Dupont) were used in place of the copolymer (1-a), and the components used and the amounts thereof were varied to those set forth in Table 16.

The results are set forth in Table 17.

TABLE 16

| Composition | Amount [part(s) by weight] |
|---|---|
| Natural rubber | 60 |
| Chloroprene rubber | 40 |
| Stearic acid | 1 |
| Zinc white | 5 |
| FEF carbon black 1) | 100 |
| Process oil 2) | 20 |
| Trimethylolpropane trimethacrylate 3) | 1 |
| Dicumyl peroxide | 6.8 |
| Mercaptobenzimidazole | 1 |
| Polymer of 2,2,4-trimethyl-1,2-dihydroquinoline | 0.5 |

1) trade name: Asahi #50, available from Asahi Carbon K.K.
2) trade name: Diana Process Oil PW-90, available from Idemitsu Kosan Co., Ltd.
3) trade name: Highcross, available from Seiko Kagaku Kogyo K.K.

Example 31

The rubber compound obtained in the same manner as described in Example 28 was extrusion molded into a molded product of wiper blade form, and the molded product was vulcanized in a steam under a pressure of 6.5 kg/cm² for 30 minutes to obtain a wiper blade rubber molded product.

The wiper blade rubber molded product thus obtained was evaluated on frictional properties and ozone resistance by the following tests.

The results are set forth in Table 18.
Test methods
(1) Frictional properties
  (a) Friction coefficient The wiper blade rubber molded product was subjected to durability test using a flat glass plate under the following conditions, and a friction coefficient of the rubber molded product in a dry state was measured.
Wiper blade rubber length: 100 mm
Arm load: 155 g
Stroke length: 150 mm
Speed: 45 reciprocations per minute
Cycle of water spray: 1-minute water spraying and 4-minute water stopping (b) Friction coefficient after weathering test The specimen having been subjected to sunshine weatherometer exposure of 1,000 hours was measured on the friction coefficient in the same manner as described in the above test (a).
(2) Ozone resistance The ozone resistance test was conducted in an ozone testing vessel (static test, ozone concentration: 50 pphm, elongation rate: 20% temperature 40° C. time: 200 hours), and a period of time at the end of which crack occurred was measured.

Example 32

The rubber compound obtained in the same manner as described in Example 28 and the rubber compound for wiper blade obtained in Comparative Example 2 were subjected to two-layer extrusion molding to prepare a wiper blade whose surface was covered with the rubber compound of Example 28, and the thus prepared wiper blade was vulcanized in a steam under a pressure of 6.5 kg/cm² for 30 minutes to obtain a wiper blade rubber molded product.

The wiper blade rubber molded product thus obtained was evaluated on frictional properties and ozone resistance in the same manner as described in Example 31.

The results are set forth in Table 18.

Comparative Example 15

The procedures of Example 32 were repeated except that the rubber compound obtained in the same manner as described in Comparative Example 13 was used in place of the rubber compound obtained in the same manner as described in Example 28.

The results are set forth in Table 18.

Comparative Example 16

The procedures of Example 32 were repeated except that a wiper blade in which the surface of the rubber compound obtained in the same manner as described in Example 28 was covered with the rubber compound for wiper blade obtained in Comparative Example 14 was prepared by the two-layer extrusion molding.

The results are set forth in Table 18.

TABLE 17

|  | Ex. 28 | Ex. 29 | Ex. 30 | Comp. Ex. 13 | Comp. Ex. 14 |
|---|---|---|---|---|---|
| Higher α-olefin copolymer | 1-a | 1-b | 1-c | — | — |
| $T_B$ (kgf/cm²) | 143 | 150 | 138 | 145 | 160 |
| $E_B$ (%) | 510 | 520 | 490 | 300 | 600 |
| $T_R$ (kg/cm) | 29 | 30 | 28 | 37 | 50 |
| $H_S$ | 55 | 58 | 52 | 60 | 60 |
| Thermal aging resistance | | | | | |
| $A_R (T_B)$ (%) | 104 | 103 | 105 | 97 | 110 |
| $A_R (E_B)$ (%) | 83 | 85 | 82 | 88 | 76 |
| Weathering resistance | | | | | |
| $A_R (T_B)$ (%) | 99 | 98 | 99 | 96 | 43 |
| $A_R (E_B)$ (%) | 98 | 98 | 98 | 80 | 49 |
| Change of appearance | None | None | None | None | Observed |
| Ozone resistance Crack occurrence time (hr) | >1000 | >1000 | >1000 | >1000 | 60 |
| Flexural test (No. of times to crack growth) | | | | | |
| 1) before aging | >10⁵ | >10⁵ | >10⁵ | <10³ | >10⁵ |
| 2) after aging | >10⁵ | >10⁵ | >10⁵ | <10³ | <10³ |

TABLE 18

|  | Ex. 31 | Ex. 32 | Comp. Ex. 15 | Comp Ex. 16 |
|---|---|---|---|---|
| Higher α-olefin copolymer | 1-a | 1-a | — | 1-a |
| Frictional properties (Friction coefficient) | | | | |
| a) Before weathering resistance test | | | | |
| No. of blade reciprocation times | | | | |
| 0 | 0.74 | 0.73 | 1.03 | 1.06 |
| 53 | 0.78 | 0.76 | 1.11 | 1.71 |
| b) After weathering resistance test | | | | |
| No. of blade reciprocation times | | | | |
| 0 | 0.75 | 0.73 | 1.06 | 1.24 |
| 53 | 0.76 | 0.77 | 1.16 | 2.16 |
| Ozone resistance Crack occurrence time [hr] | >1000 | >1000 | >1000 | 70 |

Rubber molded product for roll

Example 33

The same copolymer (1-a) as used in Example 1 was mixed with additives set forth in Table 19 to obtain an unvulcanized rubber compound.

TABLE 19

| Composition | Amount [part(s) by weight] |
|---|---|
| Higher α-olefin copolymer | 100 |
| Stearic acid | 3 |
| Zinc white 1) | 5 |
| FEF carbon black 2) | 50 |
| Process oil 3) | 25 |
| Vulcanizing agent 4) | 0.6 |
| Vulcanization accelerator 5) | 0.3 |
| Vulcanization accelerator 6) | 0.6 |

1) trade name: Zinc White No. 1, available from Sakai Kagaku Kogyo K.K.
2) trade name: Asahi #60, available from Asahi Carbon K.K.
3) trade name: Diana Process Oil PW-380, available from Idemitsu Kosan Co., Ltd.
4) trade name: Barnack R, available from Ouchi Shinko Kagaku Kogyo K.K.
5) trade name: Nocseller TRA, available from Ouchi Shinko Kagaku Kogyo K.K.
6) trade name: Nocseller TT, available from Ouchi Shinko Kagaku Kogyo K.K.

In the above procedure, the higher α-olefin copolymer (a-1), zinc white, a stearic acid, FEF carbon and a process oil were kneaded with each other for 5 minutes using a 4.3-liter Banbury mixer (produced by Kobe Seiko K.K.), and the resulting kneadate was allowed to stand for 1 day at room temperature. To the kneadate thus obtained were added the vulcanization accelerators and sulfur, and they were kneaded by means of open-rolls to obtain a rubber compound. The rubber compound was rolled to obtain a rubber compound sheet having a thickness of about 2 mm. The surface temperatures of the front roll and the back roll were 50° C. and 60° C., respectively, and the rotation numbers of the front roll and the back roll were 16 rpm and 18 rpm, respectively.

The above-obtained rubber sheet was wound up around a metallic core of hollow pipe form (SUS 304) having an outer diameter of 60 mm, then a cloth made of glass fiber was wound up helically on the surface of the rubber sheet, and the rubber sheet was vulcanized at 160° C. for 30 minutes. After completion of the vulcanization, the vulcanized rubber was cooled and separated from the metallic core. The vulcanized rubber was measured on stress at break $T_B(1)$, elongation at break $E_B(1)$ and JIS A hardness $H_S(1)$ in accordance with JIS K 6301.

Subsequently, the above specimen was aged in air at 150° C. for 3 days, and the aged specimen was measured on the stress at break $T_B(2)$, the elongation at break $E_B(2)$. and the JIS A hardness $H_S(2)$ in the same manner as described above.

The breaking energy can be expressed approximately by a tensile product $(T_B \times E_B)$, so that a ratio (TE) between the tensile product before aging and the tensile product after aging and a difference $(\Delta H_S)$ between the JIS A hardness before aging and the JIS A hardness after aging were calculated by the following formulae, and the obtained values were taken as a measure of thermal aging resistance.

$$TE(\%) = \{[(T_B \text{ after aging}) \times (E_B \text{ after aging})]/[(T_B \text{ before aging}) \times (E_B \text{ before aging})]\} \times 100$$

$$= \{[T_B(2) \times E_B(2)]/[T_B(1) \times E_B(1)]\} \times 100$$

$$\Delta H_S = H_S(2) - H_S(1)$$

Further, a permanent compression set test was carried out in accordance with JIS K 6301 under the conditions of a temperature of 100° C. or −10° C. and a period of time of 70 hours.

Moreover, a Pico abrasion test was carried out in accordance with ASTM D 2228 using a vulcanized specimen obtained from the above-mentioned rubber compound, to determine an abrasion index of the specimen.

Then, the unvulcanized sheet of the rubber compound having a thickness of 2 mm was punched to give a dumbbell specimen of No. 1 type in accordance with JIS K 6301. The specimen was subjected to a tensile test under the conditions of a tensile rate of 100 mm/min and a temperature of 23° C. to determine the tensile strength at yield, and the obtained value was taken as a measure of shape retention of the unvulcanized rubber compound.

The results are set forth in Table 21.

Example 34

The procedures of Example 33 were repeated except that the same copolymer (1-b) as used in Example 18 was used in place of the copolymer (1-a).

The results are set forth in Table 21.

Example 35

The procedures of Example 33 were repeated except that the same copolymer (1-c) as used in Example 19 was used in place of the copolymer (1-a).

The results are set forth in Table 21.

Comparative Example 17

The procedure of Example 33 were repeated except that an ethylene/propylene/5-ethylidene-2-norbornene copolymer (EPDM) having a molar ratio of ethylene to propylene of 80/20 (ethylene/propylene), a Mooney viscosity [$ML_{1+4}$ (100° C.)] of 120 and an iodine value of 10 was used in place of the copolymer (1-a), and the components used and the amounts thereof were varied to those set forth in Table 20.

The results are set forth in Table 21.

TABLE 20

| Composition | Amount [part(s) by weight] |
|---|---|
| EPDM | 100 |
| Stearic acid | 1 |
| Zinc white | 5 |
| FEF carbon black 1) | 40 |
| Process oil 2) | 100 |
| Sulfur | 1.5 |
| Vulcanization accelerator 3) | 1.5 |
| Vulcanization accelerator 4) | 0.5 |

1) trade name: Asahi #60, available from Asahi Carbon K.K.
2) trade name: Diana Process Oil PW-380, available from Idemitsu Kosan Co., Ltd.
3) trade name: Nocseller TS, available from Ouchi Shinko Kagaku Kogyo K.K.
4) trade name: Nocseller M, available from Ouchi Shinko Kagaku Kogyo K.K.

TABLE 21

|  | Ex. 33 | Ex. 34 | Ex. 35 | Comp. Ex. 17 |
|---|---|---|---|---|
| Higher α-olefin copolymer | 1-a | 1-b | 1-c | — |
| $T_B(1)$ (kgf/cm$^2$) | 106 | 118 | 93 | 60 |
| $E_B(1)$ (%) | 460 | 460 | 470 | 590 |
| $H_S(1)$ | 31 | 32 | 28 | 30 |
| $T_B(2)$ (kgf/cm$^2$) | 118 | 120 | 114 | 110 |
| $E_B(2)$ (%) | 100 | 101 | 92 | 73 |
| $T_E$ | 24 | 22 | 24 | 22 |
| $\Delta H_2$ | 6 | 6 | 7 | 9 |
| Permanent compression set (%) |  |  |  |  |

TABLE 21-continued

|  | Ex. 33 | Ex. 34 | Ex. 35 | Comp. Ex. 17 |
|---|---|---|---|---|
| 100° C., 70 hrs | 19 | 18 | 21 | 48 |
| −10° C., 70 hrs | 9 | 8 | 10 | 37 |
| Abrasion index | 81 | 80 | 90 | 50 |
| Strength at yield of unvulcanized rubber (kgf/cm²) | 8 | 9 | 7 | 2 |

Rubber belt molded product

Example 36

The same copolymer (1-a) as used in Example 12 was mixed with additives set forth in Table 22 to obtain an unvulcanized rubber composition.

TABLE 22

| Composition | Amount [part(s) by weight] |
|---|---|
| Higher α-olefin copolymer | 100 |
| Stearic acid | 3 |
| Zinc white | 5 |
| ISAF carbon black 1) | 60 |
| Sulfur | 0.3 |
| Vulcanization accelerator 2) | 0.5 |
| Vulcanization accelerator 3) | 0.2 |

1) trade name: Asahi #80, available from Asahi Carbon K.K.
2) trade name: Nocseller M, available from Ouchi Shinko Kagaku Kogyo K.K.
3) trade name: Nocseller TT, available from Ouchi Shinko Kagaku Kogyo K.K.

In the above procedure, the higher α-olefin copolymer (1-a), zinc white, a stearic acid and ISAF carbon were kneaded with each other for 5 minutes using a 4.3-liter Banbury mixer (produced by Kobe Seiko K.K.), and the resulting kneadate was allowed to stand for 1 day at room temperature. To the kneadate thus obtained were added the vulcanization accelerators and sulfur, and they were kneaded by means of open-rolls to obtain a rubber compound. The surface temperatures of the front roll and the back roll were 50° C. and 60° C., respectively, and the rotation numbers of the front roll and the back roll were 16 rpm and 18 rpm, respectively.

The rubber compound obtained above was charged in both a mold for forming a belt and a mold for forming a specimen for flexural test, and the rubber compound in each mold was vulcanized for 20 minutes by means of a press heated to 160° C. The resulting vulcanized product was subjected to the following tests. The test items are as follows.

Test items

Tensile test, hardness test, aging test, flexural test, and measurement of elastic modulus were carried out.

Test methods

The tensile test, hardness test, aging test and flexural test were carried out in accordance with JIS K 6301. That is, tensile strength ($T_B$) and elongation ($E_B$) were measured in the tensile test, and JIS A hardness ($H_S$) was measured in the hardness test.

The aging test was conducted by heating the vulcanized product with hot air of 135° C. for 70 hours. In this test, retentions of physical properties of the vulcanized product before aging, i.e., retention of tensile strength $A_R(T_B)$, retention of elongation $A_R(E_B)$ and change in hardness ($\Delta H_S$), were measured.

In the flexural test, resistance to crack growth was examined by means of De Mattia flexometer. In detail, the specimen was repeatedly flexed until a length of a crack reached 15 mm, and the number of flexure times was counted.

As a measure of change of elastic modulus depending on a temperature, a complex elastic modulus (G*) was measured at 10 Hz using a dynamic spectrometer (produced by Reometrics Co., Ltd.).

The results are set forth in Table 24.

Example 37

The procedures of Example 36 were repeated except that the same copolymer (1-b) as used in Example 18 was used in place of the copolymer (1-a).

The results are set forth in Table 24.

Example 38

The procedures of Example 36 were repeated except that the same copolymer (1-c) as used in Example 19 was used in place of the copolymer (1-a). 15 The results are set forth in Table 24.

Comparative Example 18

The procedures of Example 36 were repeated except that a chloroprene rubber (trade name: Neoprene WRT, available from Dupont) was used, and the components used and the amounts thereof were varied to those set forth in Table 23.

The results are set forth in Table 24.

TABLE 23

| Composition | Amount [part(s) by weight] |
|---|---|
| Chloroprene rubber | 100 |
| Stearic acid | 2 |
| Magnesia 1) | 4 |
| FEF carbon black 2) | 40 |
| Plasticizer 3) | 10 |
| Vulcanizing agent 4) | 5 |
| Vulcanization accelerator 5) | 0.5 |

1) trade name: Kyowa Mag #150, available from Tokai Carbon K.K.
2) trade name: Shiest SO, available from Tokai Carbon K.K.
3) trade name: DOP, available from Hiroshima Wako K.K.
4) trade name: Zinc White No. 1, available from Sakai Kagaku Kogyo K.K.
5) trade name: Accel 22, available from Kawaguchi Kagaku Kogyo K.K.

TABLE 24

|  | Ex. 36 | Ex. 37 | Ex. 38 | Comp. Ex. 18 |
|---|---|---|---|---|
| Higher α-olefin copolymer | 1-a | 1-b | 1-c | — |
| $T_B$ (kgf/cm²) | 159 | 167 | 141 | 176 |
| $E_B$ (%) | 460 | 460 | 430 | 330 |
| $H_S$ | 62 | 65 | 58 | 65 |
| $A_R (T_B)$ (%) | 104 | 102 | 101 | 100 |
| $A_R (E_B)$ (%) | 95 | 97 | 94 | 35 |
| $\Delta H_2$ | −2 | −2 | −1 | +24 |
| Flexural test (number of times to crack growth) | >10⁵ | >10⁵ | >10⁵ | >10⁵ |

Vibration-insulating rubber molded product

Example 39

The same copolymer (1-a) as used in Example 12 was mixed with additives set forth in Table 25 to obtain an unvulcanized rubber compound.

TABLE 25

| Composition | Amount [part(s) by weight] |
|---|---|
| Higher α-olefin copolymer | 100 |
| Stearic acid | 3 |
| Zinc white | 10 |
| FEF carbon 1) | 50 |
| Sulfur | 0.3 |
| Vulcanization accelerator 2) | 0.5 |

TABLE 25-continued

| Composition | Amount [part(s) by weight] |
|---|---|
| Vulcanization accelerator 3) | 0.5 |

1) trade name: Shiest SO, available from Tokai Carbon K.K.
2) trade name: Nocseller M, available from Ouch Shinko Kagaku Kogyo K.K.
3) trade name: Nocseller TT, available from Ouchi Shinko Kagaku Kogyo K.K.

In the above procedure, the higher α-olefin copolymer (1-a), zinc white, a stearic acid and FEF carbon were kneaded with each other for 6 minutes in a 4.3-liter Banbury mixer (produced by Kobe Seiko K.K.), and the resulting kneadate was allowed to stand for 1 day at room temperature. To the kneadate thus obtained were added the vulcanization accelerators and sulfur, and they were kneaded by means of open-rolls to obtain a rubber compound. The surface temperatures of the front roll and the back roll were 50° C. and 60° C., respectively, and the rotation numbers of the front roll and the back roll were 16 rpm and 18 rpm, respectively.

The rubber compound obtained above was heated for 20 minutes by means of a press heated to 160° C. to prepare a vulcanized sheet. The vulcanized sheet was subjected to the following tests. The test items are as follows.

Test items

Flexural test and adhesion test were carried out.

Test method

In the flexural test, resistance to crack growth was examined by means of De Mattia flexometer in accordance with JIS K 6301. In detail, the vulcanized sheet was repeatedly flexed until a length of a crack reached 15 mm, and the number of flexure times was counted. The number of flexure times was taken as a measure of dynamic fatigue resistance. Further, the specimen having been aged under heating with hot air of 120° C. for 70 hours was subjected to the same flexural test.

In the adhesion test, adhesion of the vulcanized sheet to metal was examined in accordance with Method A of ASTM D 429. As an adhesive, Chemrock 253 (available; from Road Far East K.K.) was used.

The results are set forth in Table 28.

Example 40

The procedures of Example 39 were repeated except that the same copolymer (1-b) as used in Example 18 was used in place of the copolymer (1-a).

The results are set forth in Table 28.

Example 41

The procedures of Example 39 were repeated except that the same copolymer (1-c) as used in Example 19 was used in place of the copolymer (1-a).

The results are set forth in Table 28.

Comparative Example 19

A natural rubber (RSS #3) was roughly kneaded by means of 14-inch open-rolls so that the rubber had a Mooney viscosity [$ML_{1+4}$ (100° C.)] of 60. The thus roughly kneaded natural rubber was mixed with additives set forth in Table 26, and they were kneaded by the Use of open-rolls to obtain an unvulcanized rubber compound.

Then, the rubber compound was heated for 60 minutes by means of a press heated to 140° C. to prepared vulcanized sheet. The vulcanized sheet was subjected to the same tests as described in Example 39.

The results are set forth in Table 29.

TABLE 26

| Component of composition | Amount [part(s) by weight] |
|---|---|
| Natural rubber | 100 |
| Stearic acid | 2 |
| Zinc white | 3 |
| FEF carbon 1) | 40 |
| Process oil 2) | 10 |
| Anti-aging agent 3) | 1 |
| Sulfur | 0.3 |
| Vulcanization accelerator 4) | 0.5 |

1) trade name: Shiest SO, available from Tokai Carbon K.K.
2) trade name: Diana Process Oil AH-16, available from Idemitsu Kosan Co., Ltd.
3) trade name: Noclac DP, available from Ouchi Shinko Kagaku Kogyo K.K.
4) trade name: Nocseller DM, available from Ouchi Shinko Kagaku Kogyo K.K.

Comparative Example 20

The procedures of Example 39 were repeated except that an ethylene/propylene/5-ethylidene-2-norbornene copolymer (EPDM) having a molar ratio of ethylene to propylene of 75/25 (ethylene/propylene), a Mooney viscosity [$ML_{1+4}$(100° C.)] of 70 and an iodine value of 10 was used in place of the copolymer (1-a), and the components used and the amounts thereof were varied to those set forth in Table 27.

The results are set forth in Table 29.

TABLE 27

| Component of composition | Amount [part(s) by weight] |
|---|---|
| EPDM | 100 |
| Stearic acid | 1 |
| Zinc white | 5 |
| FEF carbon 1) | 40 |
| Process oil 2) | 10 |
| Sulfur | 1.5 |
| Vulcanization accelerator 3) | 1.5 |
| Vulcanization accelerator 4) | 0.5 |

1) trade name: Shiest SO, available from Tokai Carbon K.K.
2) trade name: Diana Process Oil PW-380, available from Idemitsu Kosan Co., Ltd.
3) trade name: Nocseller TS, available from Ouchi Shinko Kagaku Kogyo K.K.
4) trade name: Nocseller M, available from Ouchi Shinko Kagaku Kogyo K.K.

TABLE 28

| | Ex. 39 | Ex. 40 | Ex. 41 |
|---|---|---|---|
| Flexural test (No. of times to crack growth) | | | |
| 1) before aging | $>10^6$ | $>10^6$ | $>10^6$ |
| 2) after aging | $>10^6$ | $>10^6$ | $>10^6$ |
| Adhesion properties | R-100 | R-100 | R-100 |

(Note 1)
R-100: breakage of rubber portion = 100%

TABLE 29

| | Comp. Ex. 19 | Comp. Ex. 20 |
|---|---|---|
| Flexural test (No. of times to crack growth) | | |
| 1) before aging | $3 \times 10^5$ | $<10^3$ |
| 2) after aging | $<10^3$ | $<10^3$ |
| Adhesion properties | R-100 | R-25, RC-75 |

(Note 1)
R-100: breakage of-rubber portion = 100%
R-25: breakage of rubber portion = 25%
RC-75: interfucial debonding between rubber and adhesive = 75%

What is claimed is:

1. A higher α-olefin copolymer comprising monomer units derived from a higher α-olefin having 6 to 20 carbon atoms, an aromatic ring-containing vinyl monomer represented by the following formula [I] and, a non-conjugated diene represented by the following formula [II], said copolymer having:
(i) a molar ratio of the higher α-olefin to the aromatic ring-containing vinyl monomer ranging from 95/5 to 30/70,
(ii) a content of the non-conjugated diene ranging from 0.01 to 30% by mol, and
(iii) an intrinsic viscosity [η], as measured in decalin at 135° C., of 0.1 to 10 dl/g;

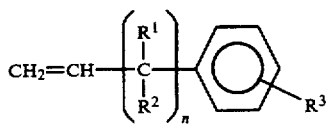
[I]

wherein n is an integer of 0 to 5, and $R^1$, $R^2$ and $R^3$ are each independently a hydrogen atom or an alkyl group of 1 to 8 carbon atoms;

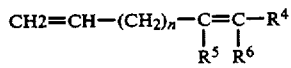
[II]

2. A higher α-olefin copolymer rubber composition comprising:
[A] a higher α-olefin copolymer comprising monomer units derived from a higher α-olefin having 6 to 20 carbon atoms, an aromatic ring-containing vinyl monomer represented by the following formula [I] and a non-conjugated diene represented by the following formula [II], and
[B] a diene rubber,
a weight ratio ([A]/[B]) of said higher α-olefin copolymer [A] to said diene rubber [B] being in the range of 1/99 to 90/10;

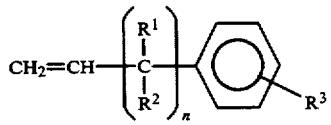
[I]

wherein n is an integer of 0 to 5, and $R^1$, $R^2$ and $R^3$ are each independently a hydrogen atom or an alkyl group of 1 to 8 carbon atoms;

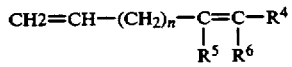
[II]

wherein n is an integer of 1 to 5, $R^4$ is an alkyl group of 1 to 4 carbon atoms, and $R^5$ and $R^6$ are each independently a hydrogen atom or an alkyl group of 1 to 8 carbon atoms, provided that both of $R^5$ and $R^6$ are not hydrogen atoms.

3. The higher α-olefin copolymer rubber composition as claimed in claim 2, wherein a molar ratio of the higher α-olefin to the aromatic ring-containing vinyl monomer in the higher α-olefin copolymer [A] is in the range of 95/5 to 30/70.

4. The higher α-olefin copolymer rubber composition as claimed in claim 2 or claim 3, wherein the higher α-olefin copolymer [A] has an intrinsic viscosity [η], as measured in a decalin solvent at 135° C., of 0.1 to 10.0 dl/g.

5. The higher α-olefin copolymer rubber composition as claimed in any one of claims 2 or 4, wherein the higher α-olefin copolymer [A] has an iodine value of 1 to 50.

6. The higher α-olefin copolymer rubber composition as claimed in any one of claims 2 to 6, wherein the diene rubber [B] is a natural rubber, an isoprene rubber, SBR, BR or a mixture thereof.

7. A rubber composition for tire tread comprising:
[A] a higher α-olefin copolymer comprising monomer units derived from a higher α-olefin having 6 to 20 carbon atoms, an aromatic ring-containing vinyl monomer represented by the following formula [I] and a non-conjugated diene represented by the following formula [II], and
[B] a diene rubber,
a weight ratio ([A]/[B]) of said higher α-olefin copolymer [A] to said diene rubber [B] being in the range of 1/99 to 50/50;

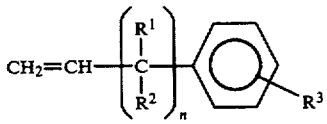
[I]

wherein n is an integer of 0 to 5, and $R^1$, $R^2$ and $R^3$ are each independently a hydrogen atom or an alkyl group of 1 to 8 carbon atoms;

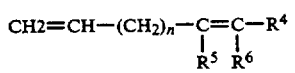
[II]

wherein n is an integer of 1 to 5, $R^4$, is an alkyl group of 1 to 4 carbon atoms, and $R^5$ and $R^6$ are each independently a hydrogen atom or an alkyl group of 1 to 8 carbon atoms, provided that both of $R^5$ and $R^6$ are not hydrogen atoms.

8. The rubber composition for tire tread as claimed in claim 7, wherein the higher α-olefin copolymer [A] has an intrinsic viscosity [η], as measured in a decalin solvent at 135° C., of 0.1 to 10.0 dl/g.

9. The rubber composition for tire tread as claimed in claim 7 or claim 8, wherein the higher α-olefin copolymer [A] has an iodine value of 1 to 50.

10. The rubber composition for tire tread as claimed in any one of claims 7 or 9, wherein the diene rubber [B] is a natural rubber, an isoprene rubber, SBR, BR or a mixture thereof.

11. A higher α-olefin copolymer rubber molded product comprising a vulcanized product of a higher α-olefin copolymer, said copolymer being a copolymer comprising monomer units derived from a higher α-olefin having 6 to 20 carbon atoms, an aromatic ring-containing vinyl monomer represented by the following formula [I] and a non-conjugated diene represented by the following formula [II], and having:
(i) a molar ratio of the higher α-olefin to the aromatic ring-containing vinyl monomer ranging from 95/5 to 30/70,
(ii) a content of the non-conjugated diene ranging from 0.1 to 20% by mol, and
(iii) an intrinsic viscosity [η], as measured in decalin at 135° C., of 0.1 to 10 dl/g;

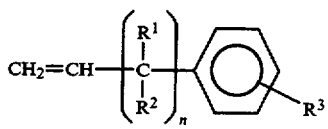

[I]

wherein n is an integer of 0 to 5, and $R^1$, $R^2$ and $R^3$ are each independently a hydrogen atom or an alkyl group of 1 to 8 carbon atoms;

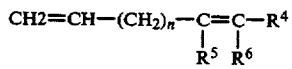

[II]

wherein n is an integer of 1 to 5, $R^4$ is an alkyl group of 1 to 4 carbon atoms, and $R^5$ and $R^6$ are each independently a hydrogen atom or an alkyl group of 1 to 8 carbon atoms, provided that both of $R^5$ and $R^6$ are not hydrogen atoms.

12. The higher α-olefin copolymer molded product as claimed in claim 11, wherein said higher α-olefin copolymer molded product is a wiper blade rubber molded product.

13. The higher α-olefin copolymer molded product as claimed in claim 11, wherein said higher α-olefin copolymer molded product is a rubber molded product for roll.

14. The higher α-olefin copolymer molded product as claimed in claim 11, wherein said higher α-olefin copolymer molded product is a rubber belt molded product.

15. The higher α-olefin copolymer molded product as claimed in claim 11, wherein said higher α-olefin copolymer molded product is a vibration-insulating rubber molded product.

16. The higher α-olefin rubber composition of claim 5, wherein the higher α-olefin copolymer [A] has an intrinsic viscosity [η], as measured in a decalin solvent at 135° C., of 0.1 to 10.0 dl/g.

17. The higher α-olefin rubber composition of claim 16, wherein the diene rubber [B] is a natural rubber, an isoprene rubber, SBR, BR or a mixture thereof.

18. The rubber composition for tire tread as claimed in claim 10, wherein the higher α-olefin copolymer [A] has a iodine value of 1 to 50.

* * * * *